United States Patent [19]

Winski et al.

[11] Patent Number: 5,256,028
[45] Date of Patent: Oct. 26, 1993

[54] PROCESS FOR HANDLING MATERIAL

[76] Inventors: Ernest P. Winski, 5413 Nickels Dr., Rte. 4, Oshkosh, Wis. 54901; Clifton B. McMurry, Rte. 4, 2692 Lakeview, Fond du Lac, Wis. 54935

[21] Appl. No.: 449,235

[22] Filed: Dec. 6, 1989

Related U.S. Application Data

[63] Continuation of Ser. No. 102,386, Sep. 29, 1987, abandoned, which is a continuation-in-part of Ser. No. 888,511, Jul. 23, 1986, abandoned.

[51] Int. Cl.$^5$ .............................. B65G 59/02
[52] U.S. Cl. .................... 414/786; 108/51.1; 108/52.1; 414/796.8
[58] Field of Search ............ 414/417, 661, 786, 789.5, 414/792.6, 792.8, 792.9, 793.4, 794.3, 794.6, 795.7, 796, 796.5, 796.7, 796.8, 907; 108/51.1, 51.3, 52.1, 53.1, 55.3, 901

[56] References Cited

U.S. PATENT DOCUMENTS

| | | | |
|---|---|---|---|
| 2,240,823 | 5/1941 | Abele | 100/31 |
| 2,455,197 | 11/1948 | Sullivan | 108/51.1 X |
| 2,764,932 | 10/1956 | Pease, III | 100/50 |
| 2,875,907 | 3/1959 | Locke et al. | 214/6 |
| 2,875,908 | 3/1959 | Woodcock | 214/6 |
| 2,878,948 | 3/1959 | Keyes | 214/6 |
| 2,940,617 | 6/1960 | Reed | 214/8.5 |
| 3,105,598 | 10/1963 | Magnuson | 214/8.5 |
| 3,149,732 | 9/1964 | Gagnon et al. | 214/6 |
| 3,157,301 | 11/1964 | McWilliams | 214/514 |
| 3,159,115 | 12/1964 | Nolan | 108/51.1 |
| 3,166,203 | 1/1965 | Jeremiah | 214/6 |
| 3,229,836 | 1/1966 | Koenig | 414/661 X |
| 3,257,006 | 6/1966 | Kampert | 214/6 |
| 3,278,048 | 10/1966 | Bruce | 214/6 |
| 3,430,585 | 3/1969 | Grant et al. | 108/51.1 |
| 3,540,385 | 11/1970 | Hobart | 108/51.1 |
| 3,594,977 | 7/1971 | Grasvoll | 53/162 |
| 3,606,310 | 9/1971 | Larson | 271/68 |
| 3,637,093 | 1/1972 | Brockmuller et al. | 214/6 P |
| 3,648,857 | 3/1972 | Grasvoll | 214/6 |
| 3,669,282 | 6/1972 | Carlson | 214/6 P |
| 3,720,176 | 3/1973 | Munroe | 108/58 |
| 3,833,132 | 9/1974 | Alduk | 214/6 |
| 3,837,140 | 9/1974 | Golantsev et al. | 53/159 |
| 3,888,364 | 6/1975 | Inoue et al. | 414/796.8 X |
| 3,901,392 | 8/1975 | Streckert | 214/6 FS |
| 3,946,883 | 3/1976 | Beal | 214/152 |
| 4,030,618 | 6/1977 | Kelley et al. | 214/6 P |
| 4,032,021 | 6/1977 | Mabey et al. | 214/8.5 F |
| 4,067,456 | 1/1978 | Schmitt | 414/84 X |
| 4,132,321 | 2/1979 | Bowlby et al. | 214/6 DK |

(List continued on next page.)

FOREIGN PATENT DOCUMENTS

| | | | |
|---|---|---|---|
| 2254519 | 5/1974 | Fed. Rep. of Germany | 414/42 |
| 3107495 | 11/1982 | Fed. Rep. of Germany | |
| 129661 | 8/1979 | Japan | 414/84 |
| 57-4824 | 1/1982 | Japan | |
| 166229 | 10/1982 | Japan | 414/119 |
| 0650703 | 2/1951 | United Kingdom | |

OTHER PUBLICATIONS

Economation, Inc. Product Literature—4 sheets.

Primary Examiner—Michael S. Huppert
Assistant Examiner—Janice Krizek
Attorney, Agent, or Firm—Thomas D. Wilhelm

[57] ABSTRACT

This invention pertains to handling of material on a supporting surface, preferably a pallet 74. It is addressed especially to the handling of thin-sectioned sheet material such as loose newspaper and magazine products in pallet loads. The invention provides material handling system and method for placing the material on a supporting surface by means of a palletizer 10 and removing it from that supporting surface by means of a depalletizer 180; and wherein the common element necessary to make the system function resides in the use of a special supporting member under each layer 178 of material in the load. Supporting members include spacing sheets 166 having novel characteristics in their top and bottom surfaces and novel pallets 216 having novel characteristics in their top surfaces.

16 Claims, 13 Drawing Sheets

U.S. PATENT DOCUMENTS

| | | | |
|---|---|---|---|
| 4,159,058 | 6/1979 | Zimmerman | 414/84 |
| 4,162,016 | 7/1979 | Schmitt | 414/85 |
| 4,172,686 | 10/1979 | Shorthouse | 414/114 |
| 4,195,959 | 4/1980 | Schmitt | 414/35 |
| 4,205,934 | 6/1980 | Pantin et al. | 414/77 |
| 4,230,049 | 10/1980 | Horne | 108/51.1 |
| 4,255,074 | 3/1981 | Meratti et al. | 414/62 |
| 4,271,755 | 6/1981 | Kintgen et al. | 100/52 |
| 4,339,220 | 7/1982 | Pulda | 414/84 |
| 4,342,531 | 8/1982 | Cox et al. | 414/46 |
| 4,507,348 | 3/1985 | Nagata et al. | 108/51.1 X |
| 4,536,119 | 8/1985 | Miaskoff | 414/100 |
| 4,613,267 | 9/1986 | Mohr et al. | 414/42 X |
| 4,635,542 | 1/1987 | Sebelist | 100/3 |
| 4,671,723 | 6/1987 | Feldkamper | 414/114 |
| 4,704,060 | 11/1987 | Winski et al. | 414/84 X |
| 4,708,247 | 11/1987 | Liebel | 206/514 X |

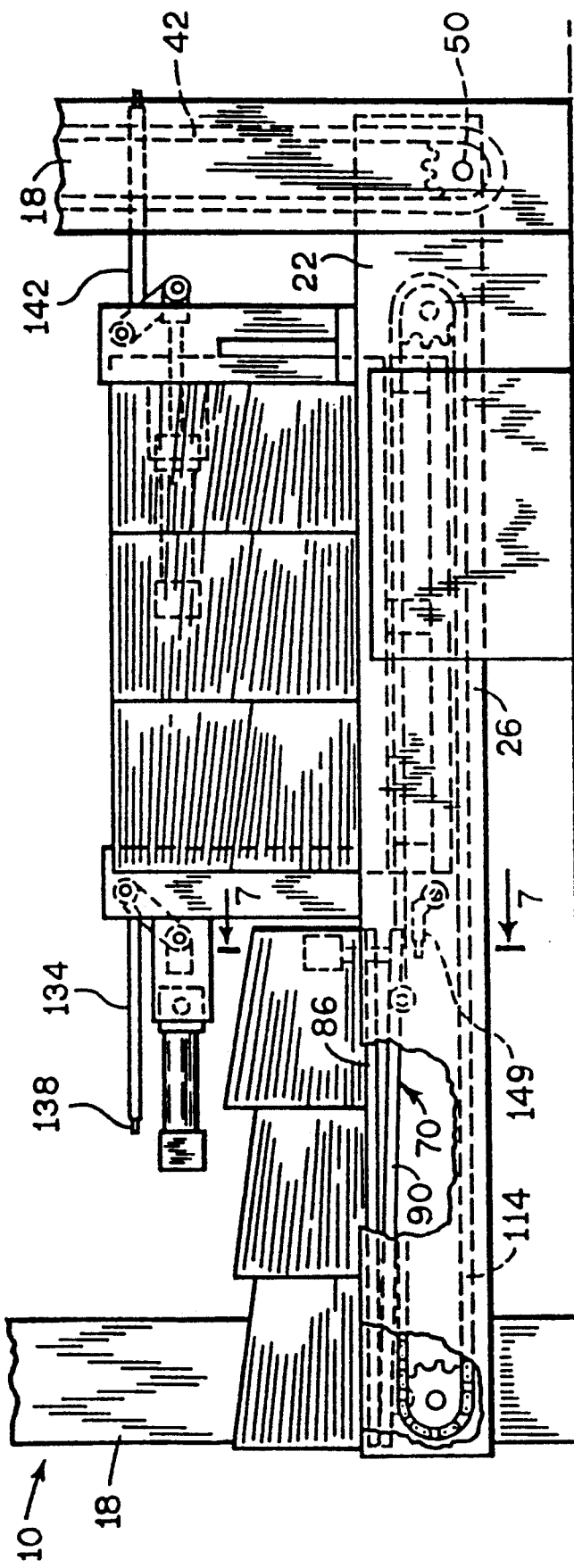
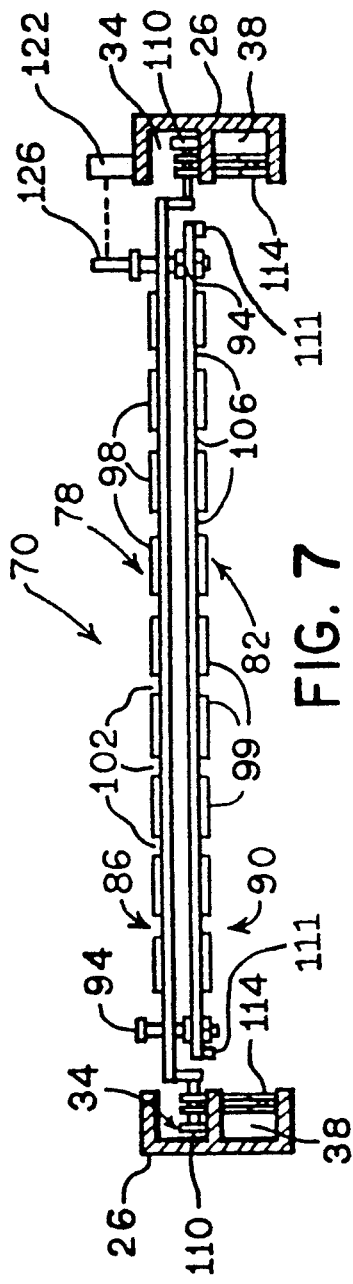
FIG. 6
FIG. 7

PROCESS FOR HANDLING MATERIAL

This application is a continuation of application Ser. No. 07/102,386, filed Sep. 29, 1987, abandoned, which is a Continuation-in-Part of application Ser. No. 888,511, filed Jul. 23, 1986, abandoned, herein incorporated by reference.

BACKGROUND OF THE INVENTION

This invention relates to handling of materials on pallets. It relates to palletizing materials and subsequently depalletizing those materials, all with a minimum amount of manual lifting on the part of attending labor or machine operators. The invention relates specifically to methods for palletizing and depalletizing thin-section materials, and especially loose stacks of printed materials such as newspapers, signatures, sheets of paper, magazines and the like; including stacks of in-process material. Individual elements of the material may be as thin as a single sheet of paper or as thick as a magazine or a book. Particularly with reference to newspapers and signatures, the loose stacks are typically compressible and of uneven height.

Apparatus for palletizing bundles of newspaper is known in the art. A conventional palletizer for boxes or cartons may use a horizontally, reciprocally movable stripper plate for carrying boxes to a position above a pallet onto which the boxes are to be loaded. The stripper plate is then withdrawn from beneath the boxes, thereby depositing them onto the pallet. Retaining means are used for preventing the boxes from moving with the stripper plate as it is withdrawn. Such retaining means commonly include a bar which abuts the side of the boxes facing the direction of stripper plate withdrawal. Structures of this general nature are disclosed in, for example, U.S. Pat. Nos. 3,149,732 Gagnon et al and 3,833,132 Alduk.

In co-pending application Ser. No. 770,268, filed Aug. 28, 1985, now U.S. Pat. No. 4,704,060, and herein incorporated by reference, there is disclosed palletizing apparatus for palletizing stacks of loose materials such as newspapers, signatures, sheets of paper, and the like. In that application, there is disclosed a plate and plate movement means, for depositing material onto a pallet or onto a partial load of material on a pallet. In that teaching, any underlying compressible materials may be compressed by the plate during the process of depositing the material. Both the material being deposited and the underlying material may be prevented from moving with the plate, by first and second projection means projecting into recessed portions of the top and bottom surfaces of the plate. The pallet load which results from loading a pallet as disclosed therein consists of a plurality of stacks extending from the underlying pallet, or a slip sheet thereon, to the upper extremity of the stack, typically the top of the pallet load. Within that environment of continuous stacks, unloading the material from the pallet is typically done by manual labor. In that process, the material is removed in a series of steps limited by the amount of material a person can manually lift at one time.

Alternatively, unloading might be done by a depalletizer wherein essentially an entire layer of the material is pushed, or swept, off the pallet at one time. The latter case of using a depalletizer is preferred in that it reduces the chance of back injury caused by excessive manual labor at the point of depalletizing, along with the associated savings in labor costs.

However, conventional palletizers do not have the capability to stack loose materials such as newspaper and the like, except as dislosed in above-mentioned application Ser. No. 770,268, now U.S. Pat. No. 4,704,060. And to the extent newspapers are stacked on a pallet as in application Ser. No. 770,268, now U.S. Pat. No. 4,704,060, there is not any conventionally known means for removing all of the load with known pallet unloading apparatus unless the load is quite small.

One problem with handling loose materials with a pallet unloading apparatus is that each unit of the load of material on the pallet must be acted upon in some way, by the apparatus, to affect the desired movement.

A load unit is herein defined as any article, or group of articles, of the load, requiring a separate external force to cause it to move. Thus a single loose sheet of paper is a unit as is a bound bundle of papers. For assembled documents, such as newspaper, each document is generally a unit of the load.

With sheets of paper, each sheet can be a unit of the load. With the small thickness of, for example, paper, it is easy for sheets, near the bottom of a stack, to be missed by that material handling apparatus which functions by action on a side of the stack, at the edges of the sheets. Yet, efficient material handling of thin sheets typically is done through interactions at the sheet edges.

Another problem with handling stacks of loose sheet materials with a pallet unloading apparatus is that only a limited stack height can be moved by pushing on a side of the stack without undue risk of toppling the stack. So some means should be provided to limit the height of an individual stack in the pallet load without the height of the individual stack determining the maximum overall amount of material which may be placed on a pallet to make up the pallet load.

It is an object of this invention to provide a method of handling material on a pallet which enables the stacking by a palletizer on a pallet, of thin and, optionally compressible, materials such as loose papers, magazines or the like, optionally in discrete layers; such that they can subsequently be removed from the pallet, in the same discrete layers, by an appropriately configured depalletizer.

As previously mentioned, palletizing apparatus useful for placing stacks of loose sheets on a pallet is disclosed in pending application Ser. No. 770,268, now U.S. Pat. No. 4,704,060, filed Aug. 28, 1985. Depalletizing apparatus and methods, and a special spacing sheet, useful with stacks of loose sheets, are disclosed in pending application Ser. No. 888,511, filed Jul. 23, 1986, now abandoned and refiled as Ser. No. 07/102,386. Palletizing apparatus is also disclosed in the following United States patents, previously cited in application Ser. No. 770,268.

| Locke et al. | 2,875,907 |
| Woodcock | 2,875,908 |
| Keyes | 2,878,948 |
| Gagnon et al. | 3,149,732 |
| Jeremiah | 3,166,203 |
| Kampert | 3,257,006 |
| Grasvoll | 3,594,977 |
| Larson | 3,606,310 |
| Brockmuller et al. | 3,637,093 |
| Grasvoll | 3,648,857 |
| Carlson | 3,669,282 |
| Alduk | 3,833,132 |

-continued

| | |
|---|---|
| Golantsev | 3,837,140 |
| Kelley | 4,030,618 |
| Schmitt | 4,162,016 |
| Schmitt | 4,195,959 |
| Pantin et al. | 4,205,934 |
| Faltin | 4,230,311 |
| Donnelly | 4,234,280 |
| Meratti et al. | 4,255,074 |
| Cox et al. | 4,342,531 |
| Sylvander | 4,383,788 |
| Werkheiser | 4,422,549 |
| Werkheiser | 4,439,084 |
| Wise | 4,477,067 |

SUMMARY OF THE INVENTION

This invention pertains to handling material on a supporting surface, such as a pallet. The handling comprises the steps of placing on the supporting surface a spacing sheet, which may optionally have a plurality of spaced apart channels extending generally across the upper surface of the spacing sheet, and placing a layer of the material on the spacing sheet. The method may include placing a second such spacing sheet on the placed layer, and placing a second layer of the material on the second spacing sheet. In those cases where the spacing sheets have the channels, the spacing sheets are preferably oriented when they are placed on the supporting surface, such that the channels extend in a direction predetermined to be desirable as a direction for sliding movement of the material off the spacing sheet.

For use with thin-section material such as sheets of paper, newspapers, book pages, or the like, the channelled spacing sheet is used. For thicker thin-section material, such as 0.25 inch or greater, the channelling is acceptable, but not necessary. In any event, the top surface of the spacing sheet must be smooth enough to provide for sliding removal of the stacks of material on it, yet not so smooth as to facilitate unintentional sliding of the material off the spacing sheet in the course of normal handling of the load of material.

In a more comprehensive embodiment of the invention, the method includes the steps of placing the previously recited spacing sheet on the supporting surface, placing a layer of material on the spacing sheet to thereby create a load, then moving the supporting surface, with the layer of material on it, to another location, and removing the material from the spacing sheet by contacting the material with pushing means and pushing the material, in the direction of the channels if any, to thereby remove the material from the spacing sheet.

A "load" is created when load material is placed on the supporting surface. The load may be large or small. It may be added to or subtracted from without losing its identity as a load with respect to the supporting surface until the entirety of the load material is removed from the supporting surface.

In the embodiments where a second spacing sheet is placed on the first layer and a second layer is deposited on the second spacing sheet, the removal of the load from the supporting surface preferably includes removing the layers individually. In that case, the top layer is pushed off the top spacing sheet, followed by removal of the top spacing sheet, followed by removing the underlying layer from the underlying spacing sheet.

In some embodiments, a plurality of layers of compressible thin-section material are placed on a single spacing sheet. In that event, it is generally desirable to compress the underlying material on the spacing sheet while an overlying layer is being added. That process generally comprises putting the second layer on a plate means wherein the plate means includes a downwardly facing surface having therein a plurality of recesses extending in the direction of the plate means movement, and an upwardly facing surface adapted to support the second layer of material. The plate means is positioned vertically above the first layer. The plate means and the first layer are brought together such that the plate means contacts the first layer. The plate means is withdrawn from under the second layer while preventing articles of the thin-section sheet material of the underlying first layer from moving with the plate means during withdrawal. The means of preventing the articles of the first layer from moving with the plate means may be by projecting projecting means upwardly into the recesses in the downwardly facing surface.

Alternatively, if the thin-section materials are not particularly compressible, such as bound books or book segments, then the plate means can stop slightly above the first layer, in which case the first layer need not be restrained while the plate means is withdrawn.

In a preferred embodiment of the method wherein a second layer of thin-section material is deposited directly onto a first compressible layer, the upwardly facing surface of the plate means has a plurality of recesses extending in the direction of plate means movement, and articles of both the first and second layers are prevented from moving with the plate means during the withdrawal by first projecting means projecting upwardly into the recesses in the downwardly facing surface and by second projecting means projecting downwardly into the recesses in the upwardly facing surface.

Certain of the features of the spacing sheet may be built into a novel pallet, in which case a seperate spacing sheet need not be used under the first layer of material in the load.

Improvements in the spacing sheets are seen in their rigidity, their freedom from localized contours caused by load material, the sliding properties of the top surface relative to those of the bottom surface, and an extended dimension of the spacing sheet.

Improvements are seen in material loads, including loaded pallets, in the use of the novel spacing sheets, and in novel pallets adapted to take on certain of the characteristics of the spacing sheets.

Highly efficient application of the invention is seen in use of a team of machines, comprising a palletizer/depaletizer system, in combination with the novel spacing sheets and/or pallets.

BRIEF DESCRIPTION OF THE DRAWINGS

FIG. 6 is an enlarged, partial side view, partially cut-away, of the palletizer of FIG. 1.

FIG. 7 is a cross-sectional view taken along line 7—7 of FIG. 6, and showing the plate means.

DETAILED DESCRIPTION OF THE INVENTION

Figure 1:
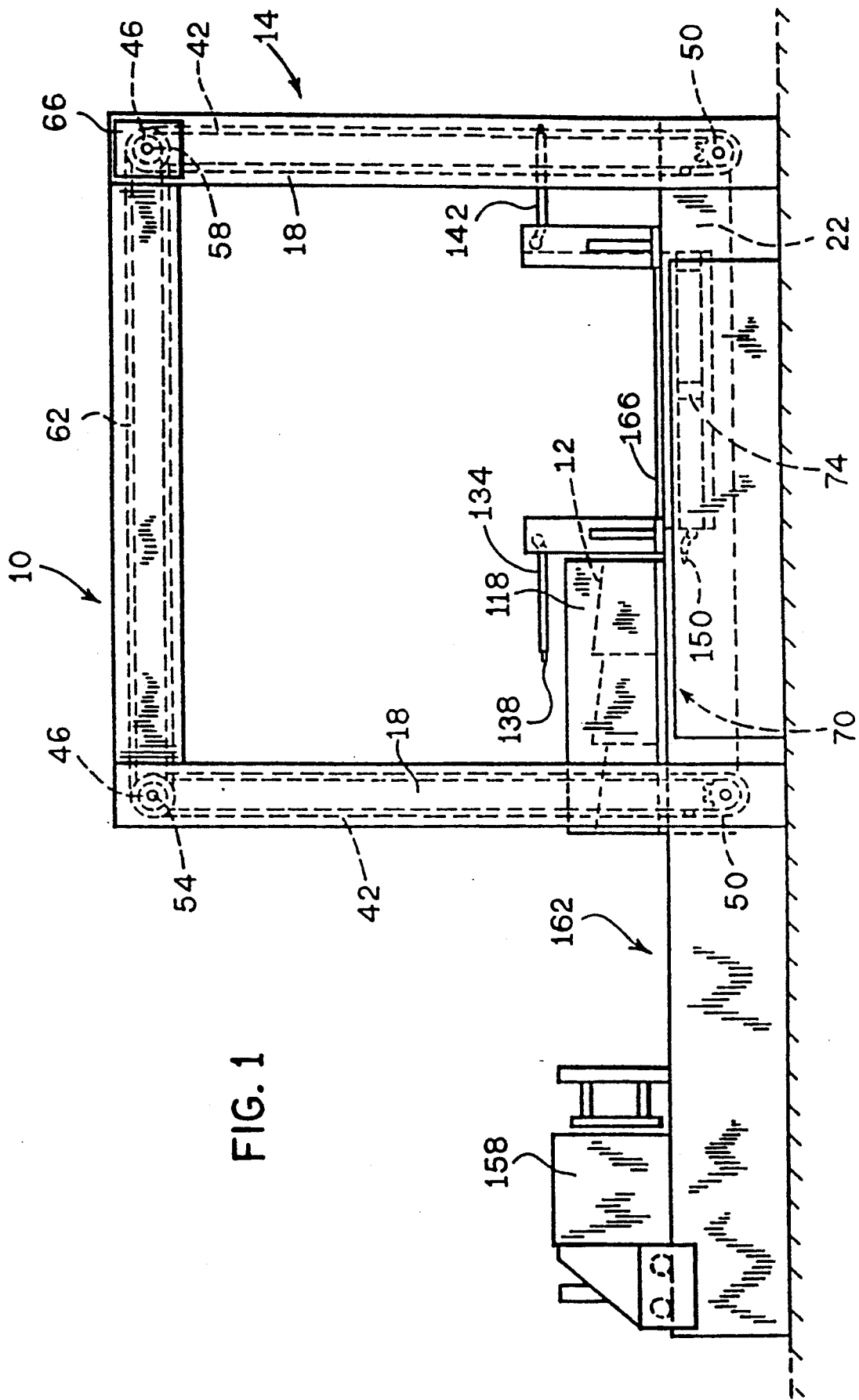
FIG. 1 is a side elevation view of a palletizer used in the invention.

A palletizer 10 embodied in the invention is illustrated in the drawings. The palletizer 10 is usable for depositing a layer of material, such as stacks 12 of loose newspapers on a supporting surface, which is any surface capable of supporting the weight of the load, such as a pallet, a spacing sheet, or a previously deposited stack of material.

Figure 2:
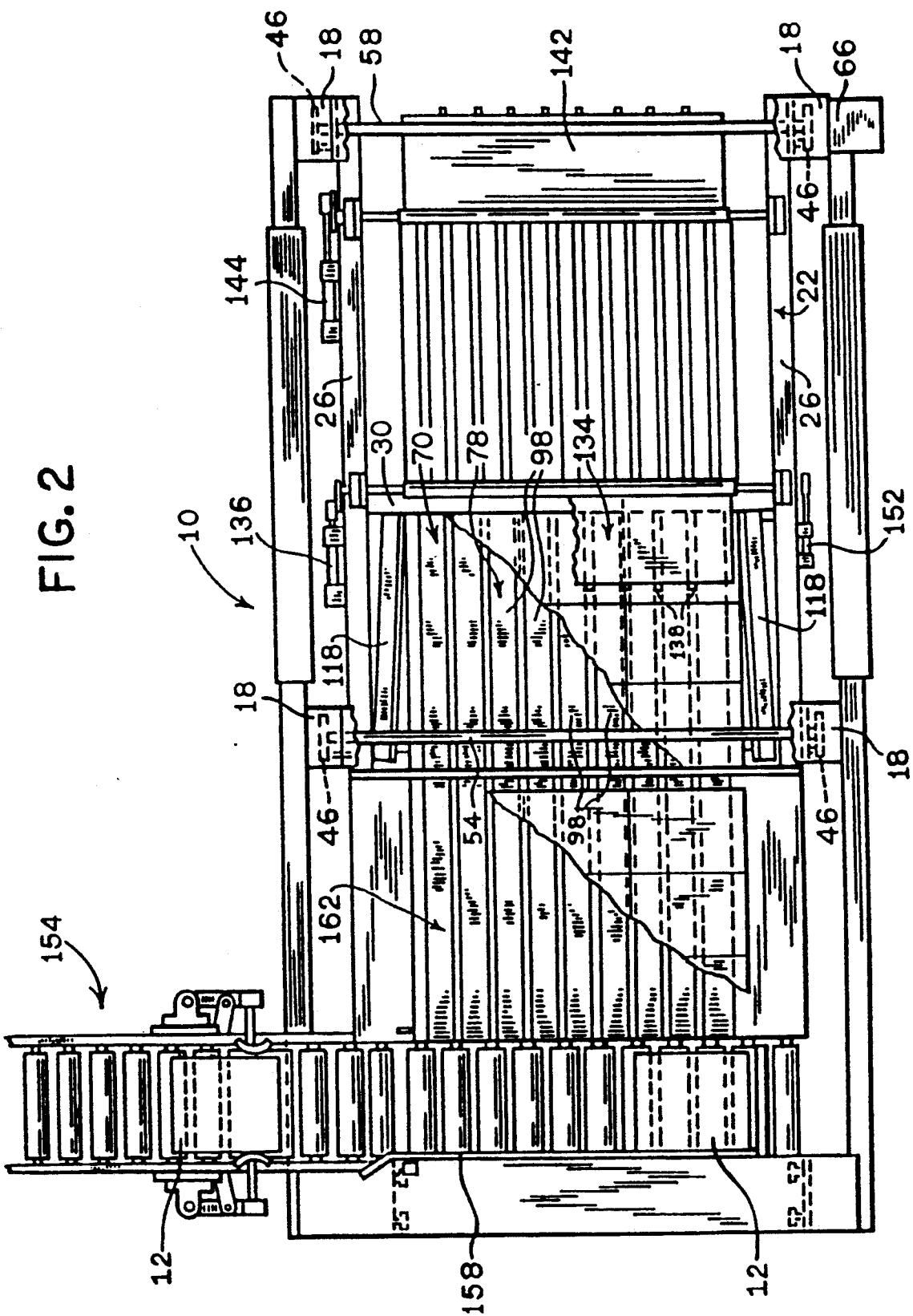
FIG. 2 is a top view of the palletizer of FIG. 1.

As best shown in FIGS. 1 and 2, the palletizer 10 comprises a frame 14 including four generally vertical members or posts 18 defining the corners of a rectangle. The palletizer 10 also comprises a generally rectangular, horizontally disposed carriage 22 having opposite first and second or right and left ends and four corners respectively connected to the four posts 18 of the frame 14 for vertical movement relative thereto. In the illustrated construction, the carriage 22 includes first and second generally parallel, horizontal, spaced apart side members 26, connected by a central connecting member 30. As best shown in FIG. 7, each of the side members 26 has an E-shaped cross-section and defines upper and lower channels 34 and 38 opening inwardly and having opposed upper and lower generally horizontal surfaces.

The palletizer 10 also comprises means for reciprocally, vertically moving the carriage 22 relative to the frame 14. In the preferred embodiment, the means for moving the carriage 22 includes means on each of the frame posts 18 for causing relative movement of the respective corner of the carriage 22. Preferably, the means on each of the posts 18 includes an endless chain 42 connected to the respective corner of the carriage 22. As best shown in FIG. 1, each post 18 includes an upper drive sprocket 46 and a lower idler sprocket 50. Endless chain 42 is mounted around the sprockets 46 and 50. The upper sprockets 46 of the two left posts 18 (as viewed in FIG. 2) are connected by a horizontal drive shaft 54 and the upper sprockets 46 of the two right posts 18 (as viewed in FIG. 2) are connected by a horizontal drive shaft 58. Also the upper sprockets 46 of the two right posts 18 (as viewed in FIG. 2) are connected by an endless drive chain 62 to the upper sprockets 46 of the left posts 18 (as viewed in FIG. 2). Drive chain 62 is shown in FIG. 1. Drive means 66 is connected to the drive shaft 58 to drive the two right chains 42, and via the endless chain 62 and the drive shaft 54, the two left chains 42. Accordingly, the four endless chains 42 move in common, thereby causing common vertical movement of the four corners of the carriage 22.

The palletizer 10 also comprises generally horizontal plate means 70 mounted on the carriage 22 for reciprocal horizontal movement relative to the carriage 22 between a first or right position (FIGS. 9 and 10) wherein the plate means 70 is adjacent the first or right end of the carriage 22 and a second or left position (FIGS. 1 and 8) wherein the plate means 70 is adjacent the second or left end of the carriage 22. A pallet 74 is placed beneath the first position of the carriage 22 so that when the plate means 70 is in the first position it is above the pallet 74. The plate means 70 includes an upwardly facing surface 78 (FIG. 7) adapted to carry the articles or stacks of papers to be palletized, during movement of the plate means 70 from the second or left position to the first or right position. The plate means 70 also includes a downwardly facing surface 82.

Figure 13:
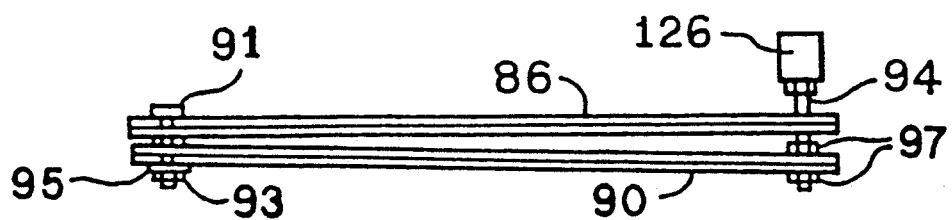
FIG. 13 is a side-view showing the relationship of the stripper plate to the sensing plate.

In the preferred embodiment of the palletizer, the plate means 70 is comprised of a stripper plate 86 including the upwardly facing surface 78, and a sensing plate 90 including the downwardly facing surface 82 of the plate means 70. The sensing plate 90 is mounted beneath the stripper plate 86 for vertical movement relative to the stripper plate 86 from a first, or lower, position seen in FIGS. 9 and 13, wherein the sensing plate 90 is spaced beneath the stripper plate 86, to a second, or higher, position seen in FIGS. 10 and 11. Preferably, the sensing plate 90 is pivotally connected to the stripper plate 86 at the left end (as viewed in FIG. 13) of the stripper plate 86, and is movably connected to the right end of the stripper plate 86. Preferably, the left end of the sensing plate 90 is pivotally connected to the left end of the stripper plate 86 by bolts 91 threaded into the stripper plate 86 and having lower ends extending through apertures in the sensing plate 90. Nuts 93 and washers 95 secure the lower ends of the bolts 91 to the sensing plate 90 while allowing room for pivotal movement of the sensing plate 90. In the illustrated construction, the right end of the stripper plate 86 includes a pair of apertures, and the right end of the sensing plate 90 has a pair of bolts 94 attached thereto and slidably extending through the apertures in the stripper plate 86. The lower end of each of the bolts 94 is secured to the sensing plate 90 by a pair of nuts 97. The heads of the bolts 94 restrict downward movement of the sensing plate 90 relative to the stripper plate 86, by abutting the surface of plate 86 adjacent the apertures.

The stripper plate 86 preferably has an upper surface having thereon a plurality of generally parallel, spaced-apart, low-friction strips 98 extending in the direction of plate means movement and wherein the upper surfaces combine to define the upwardly facing surface 78 of the plate means 70, with the spaces between the strips 98 defining recesses 102 in the upwardly facing surface 78.

In the illustrated construction, the stripper plate 86 includes a pair of guide members 118 (FIG. 2) for assisting in positioning stacks of material on the stripper plate 86.

Strips 98 and accompanying channels 102 can be omitted from stripper plate 70 so long as the thickness of the thinnest load unit to be handled is at least about 0.25 inch. Should thinner materials then need to be handled, the stripper plate 70 can readily be replaced with a plate having channels 102.

The downwardly facing surface 82 of sensing plate 90 has thereon a plurality of generally parallel, spaced-apart, low-friction strips 99 extending in the direction of plate means movement and having lower surfaces combining to define the downwardly facing surface 82 of the plate means 70, with the spaces between the strips 99 defining recesses 106 in the downwardly facing surface 82.

Preferably the plate means 70 is mounted on carriage 22 by a pair of wheels 110 rotatably mounted on one side of the stripper plate 86 and received in the upper channel 34 of the first carriage side member 26 for rolling movement along one of the upper and lower surfaces of the channel 34, and a pair of wheels 110 rotatably mounted on the other side of the stripper plate 86 and received in the upper channel 34 of the second carriage side member 26 for rolling movement along one of the upper and lower surfaces of its channel 34. Normally, as shown in FIG. 7, the wheels 110 roll along the lower surfaces of the channels 34, although under certain operating conditions, the wheels 110 may roll along the upper surfaces of the channels 34.

The palletizer 10 further comprises means for vertically moving the plate means 70 between the first or right position and the second or left position. In the preferred embodiment, the means for moving the plate means 70 includes, on each of the side members 26 of the carriage 22, an endless chain 114 extending through the upper and lower channels 34 and 38 and connecting to the plate means 70. The endless chains 114 are connected to a common drive means (not shown).

The palletizer 10 further comprises means for stopping downward movement of the carriage 22 relative to the supporting surface (such as the pallet, the previously deposited layer, or a spacing sheet). In the preferred embodiment, the means for stopping downward movement of the carriage 22 includes the sensing plate 90 and means for stopping downward movement of the carriage 22 when the sensing plate 90 moves upwardly from the first or lower position in response to contacting a supporting surface and transferring a predeterminable amount of weight to the underlying supporting surface. Preferably, as best shown in FIG. 7, this means includes a proximity sensor 122 fixedly attached to the carriage 22, and a plate 126 attached to the head of one of the bolts 94 for triggering the proximity sensor 122 when the sensing plate 90 moves upwardly relative to the stripper plate 86.

Figure 15:
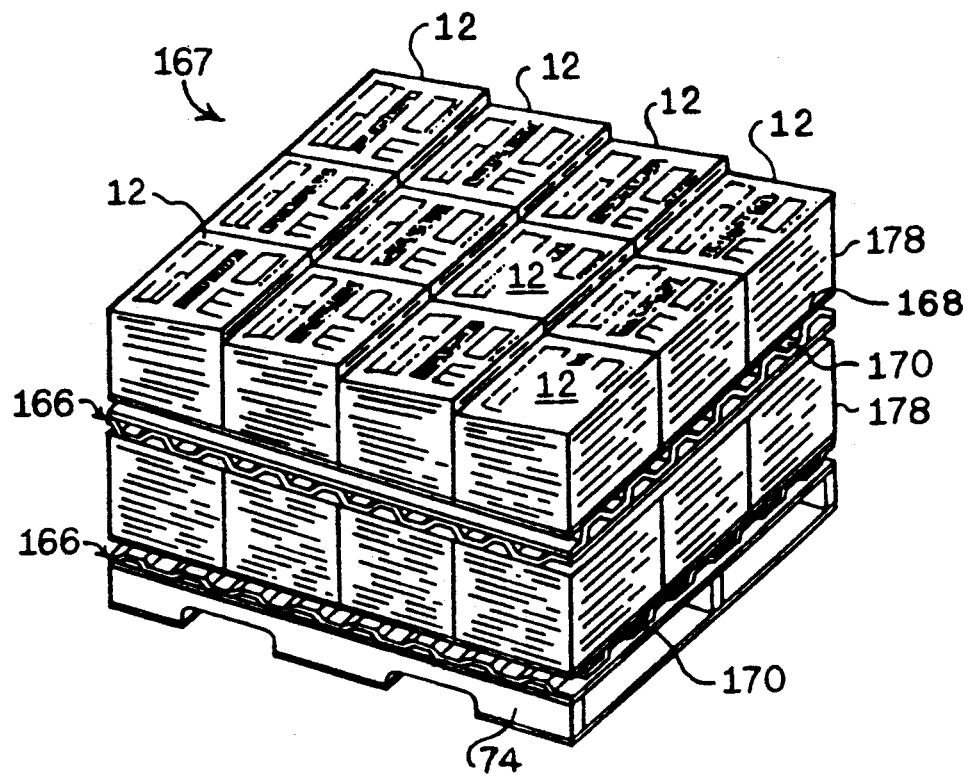
FIG. 15 shows a loaded conventional pallet wherein the load includes the spacing sheets of FIG. 4 and a plurality of layers of the material being carried.
Figure 15A:
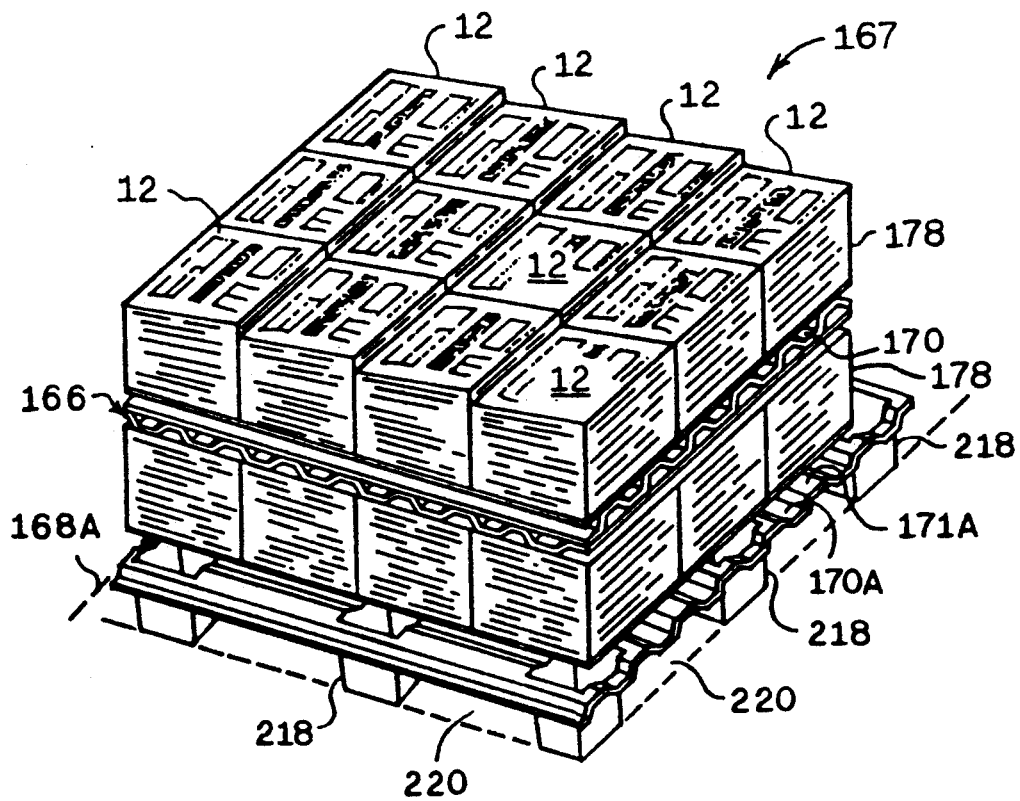
FIG. 15A shows a pallet load as in FIG. 15, with the conventional pallet and the associated lower spacing sheet having been replaced by a novel pallet (as in FIG. 4A) of this invention.

The sensing plate 90 performs at least two functions with a compressible material, such as newspapers, which forms a load having an uneven top as in FIGS. 15 and 15A. First, its weight compresses the underlying layer of material so that the underlying material layer is not greatly further compressed and pushed downwardly by the weight of the overlying material as the overlying material is transferred onto the underlying material. Secondly, as the underlying surface is compressed by the generally planar lower surface of the sensing plate, with allowance for channels 106 if present, any unevenness of the top surface, or any other discontinuity in the underlying layer, is evened out, such that a relatively uniform underlying layer is prepared, for transferring the overlying material onto the surface of the underlying layer.

Figure 10:
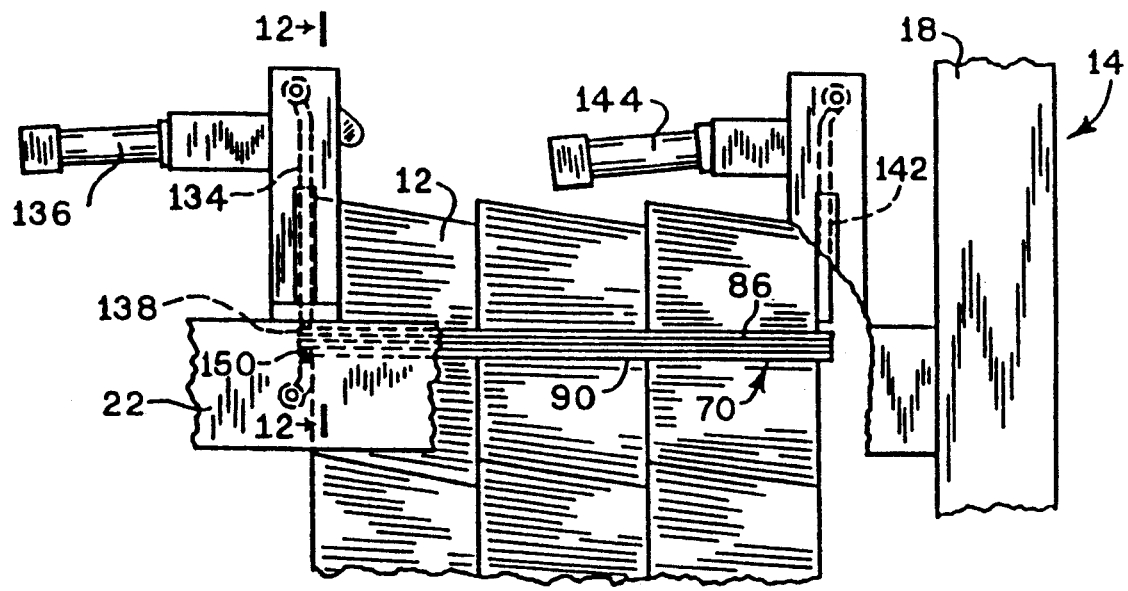

The palletizer 10 further comprises a first stripper means for preventing the stacks of paper which are on it as in FIG. 10 from moving with the stripper plate 86 as the plate means 70 is withdrawn from the first position to the second position (from right to left as in FIG. 11), and a second stripper means for preventing the underlying material from moving with the sensing plate 90 as the plate means 70 is withdrawn. In the preferred embodiment, the first stripper means includes projecting or combing means mounted on the carriage 22 and extending downwardly into the recesses 102 in the upwardly facing surface 78 of the stripper plate 86 for preventing the stacks of papers from moving with the stripper plate 86 as the plate means 70 is withdrawn.

In cases where the underlying layer is not especially compressible and its top surface is acceptably even for depositing another layer on it, then the use of sensing plate 90 is less important; as its functions of evening the top surface, and compressing the underlying load may be omitted. Thus, if desired, sensing plate 90 can be eliminated. If the sensing plate is eliminated, it is still important to retain a sensing means such as proximity sensor 122 and attach it to appropriate means for sensing the proximity of the underlying layer.

Where the underlying layer need not be compressed, then the plate means preferably stops close to the top of the underlying layer, but without necessarily touching it about the entire general top surface area. In that event, the withdrawal of the plate means, to deposit its load, causes little or no drag on the top layer, and the second retainer means, to retain the underlying layer, is usually not needed.

Figure 12:
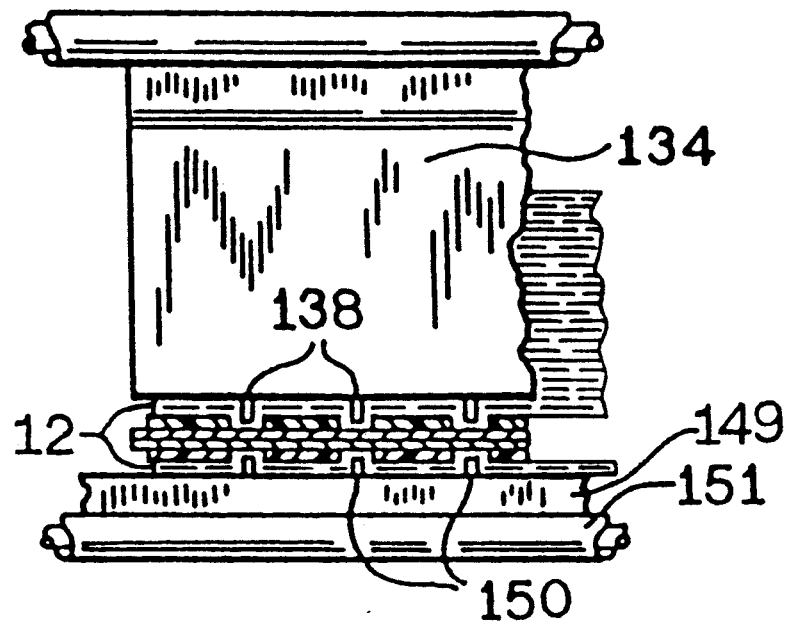
FIG. 12 is a cross-sectional view taken along line 12—12 in FIG. 10, and showing projecting means projecting into the channel means on the top and bottom surfaces of the plate means.

In the illustrated construction, the first stripper means includes an end guide member or plate 134 pivotally moveable between a raised position (see FIG. 8) wherein the plate 134 is parallel to the stripper plate 86, and a lowered position (see FIG. 9) wherein the plate 134 is perpendicular to the stripper plate 86. Linear motion means 136 moves the plate 134 between the raised and lowered positions. Plate 134 preferably includes a plurality of fingers 138 which extend downwardly from its lower end into the stripper plate recesses 102 when the plate 134 is in the lowered position. This is best seen in FIG. 12. Plate 134 and fingers 138 restrain the overlying stacks of papers as the stripper plate 86 is withdrawn.

The carriage 22 also includes a second guide member or plate 142 similar to the first plate 134 for restraining the layer of papers when the stripper plate 86 is in the first or right position. Linear motion means 144 for moving the plate 142 between its raised and lowered positions is shown in the drawings.

Figure 8:
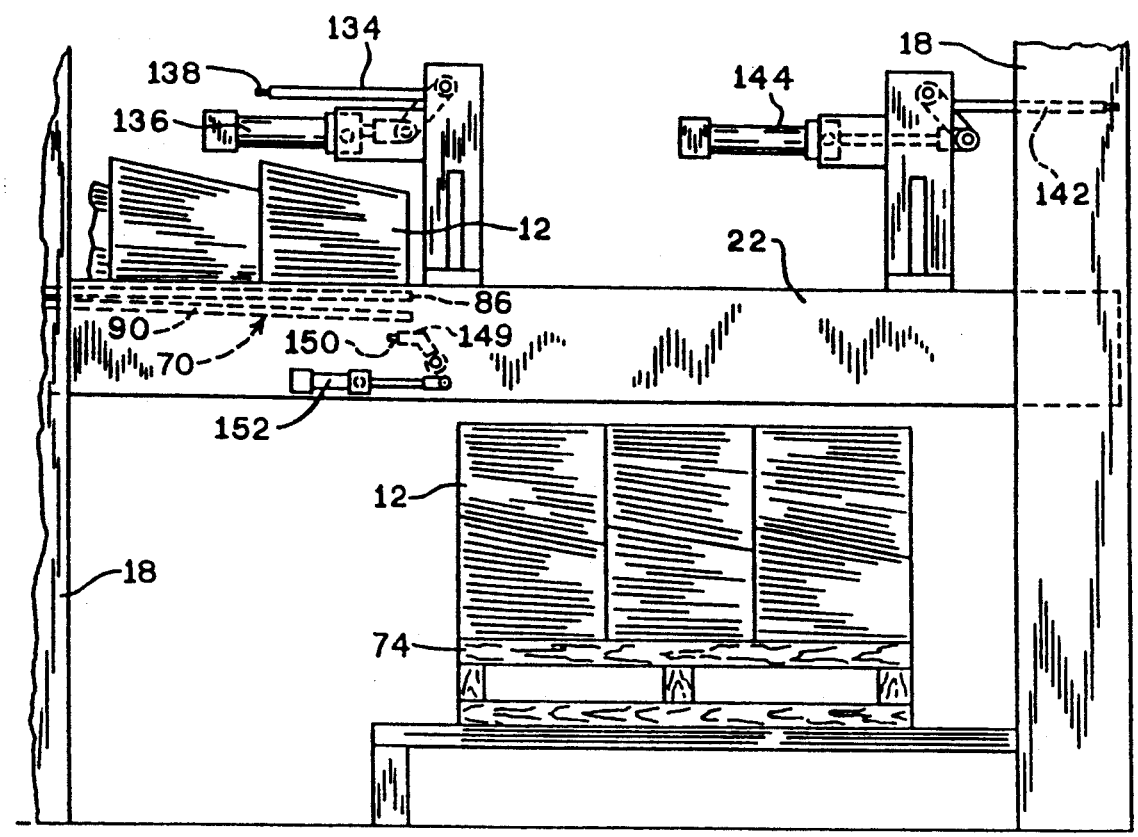
FIGS. 8-11 are enlarged, partial side views of the palletizer of FIG. 1 showing sequential operation thereof.

The second or lower stripper means preferably includes second projection or combing means mounted on the carriage 22 and extending upwardly into the recesses 106 in the downwardly facing surface 82 of the sensing plate 90 for preventing a previously deposited stack of papers from moving with the sensing plate 90 as the plate means 70 is withdrawn. Preferably, the second projection means includes a plate 149 and a plurality of fingers 150 extending upwardly from plate 149. Plate 149 is mounted on a pivotally moveable horizontal shaft 151 so as to be pivotally moveable between a lowered position best shown in FIG. 8, and raised position best shown in FIGS. 9-12. Linear motion means 152 for moving the plate 149 and fingers 150 between the raised and lowered positions is shown in FIG. 8.

The palletizer 10 further comprises conveyor means 154 (FIG. 2) extending generally perpendicularly to the direction of plate means movement adjacent the left end of the carriage 22, and means for moving stacks of papers from the conveyor means 154 onto the plate means 70 when the plate means 70 is in its second or left position. In the illustrated construction, the conveyor means 154 is a conventional roller conveyor. Other conventional types of conveyors may be selected for use with certain products. In the preferred embodiment, the palletizer 10 includes a staging area 162 (FIG. 2) between the end of the conveyor 154 and the end of the frame 14 to permit an entire layer of papers to be arranged before being pushed onto the stripper plate 86.

Preferably, the means for moving stacks of papers from the conveyor means 154 onto the stripper plate 86 includes pusher means 158 reciprocally moveable across the conveyor means 154 and the staging area 162 in the direction of plate means movement. In the preferred embodiment, the pusher means 158 includes a plurality of fingers extending downwardly between the rollers of the conveyor 154 to insure that all papers are pushed off the conveyor 154.

In some embodiments of the palletizer, the plate means 70 may not include both a stripper plate 86 and a sensing plate 90. The plate means 70 can include only a stripper plate having the low-friction strips on its upper surface and optionally on its lower surface.

The plate means 70 can be used to compress a previously deposited stack of material. In the illustrated embodiment, the sensing plate 90 causes some compression force on the previously deposited stack, as the previously deposited stack supports some of the weight of the sensing plate 90 in order to move the sensing plate 90 upwardly relative to stripper plate 86, and thus to stop downward movement of the carriage 22 through the functioning of sensor 122. To the extent a delay is caused to occur between the time the sensing plate 90 moves upwardly to trigger the proximity sensor 122 and the time when the downward movement of carriage 22 is stopped, the carriage 22 can continue to move downwardly causing the previously deposited stack to also bear the weight of the stripper plate 86 and, in some cases, even the entire carriage 22. Once the weight of the stripper plate 86 is supported by the previously deposited stack, the stripper plate wheels 110 may move upwardly in the carriage channels 34 until the wheels 110 ride along the upper surfaces of the channels 34. Further downward force may be applied by pulling downwardly on plate means 70 through chains 42 and sprockets 50. In preferred embodiments of the method of the invention, however, only a minimal amount of weight is exerted on the previously deposited stack, such that wheels 110 remain in the lower portion of the carriage channels 34. The amount of weight exerted by the sensing plate may be readily adjusted by adding weights 111 shown in FIG. 7, to sensing plate 90, or by removing weights.

Figure 3:
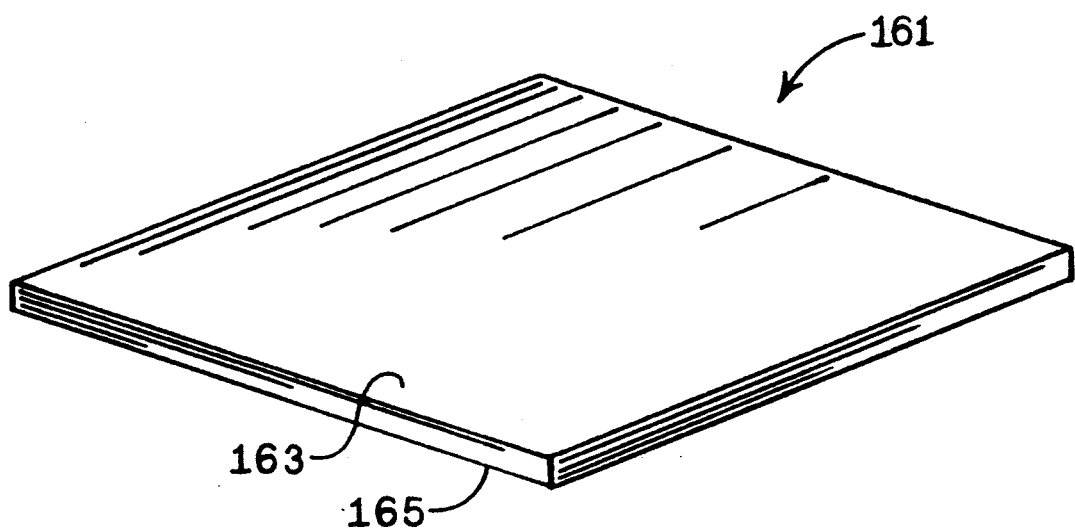
FIG. 3 shows a pictorial view of a novel spacing sheet used in this invention.

In some embodiments of the process of the invention, the palletizer 10 is desirably used in combination with a spacing sheet such as that seen at 161 in FIG. 3. The spacing sheet 161 has an upper facing surface 163 which is adapted for sliding loads of material onto and off of the sheet 161. The surface 163 is adequately smooth for facile sliding of paper-type products, yet not so slippery as to cause unintentional sliding which could cause spillage of the load, or even a shifting which would cause the load to be unbalanced, and thus affect safe lifting of the load without spillage. The degree of smoothness is selected to complement the properties of the lower surface of the load materials which it carries. Lower facing surface 165 of spacing sheet 161 preferably is characterized as a relatively higher friction surface which discourages sliding along the lower facing surface.

It is generally desirable, especially in embodiments where the uncovered top of the underlying layer is uneven and compressible, that the spacing sheet be functionally rigid, and have significant weight. Thus, it generally holds its planar configuration in use, without any localized contour changes, as measured at a surface thereof, in response to surface configurations of the underlying or overlying load. Its significant weight also effects a partial compression of the underlying layer in preparation for receiving the next, or overlying layer.

Localized surface contours and the responsive adjustments in the spacing sheet surface, in adaptation to the adjacent load surfaces, are those which are wholly contained within a radius of 3 inches about the corresponding surface contours in the layers underlying or overlying the spacing sheet. Localized surface contours and changes in those contours are readily observed when typical slip sheets and tie sheets, made from paper having a basis weight of 40-90 lbs./ream, are used under, or over, uneven layers of material.

Fully satisfactory spacing sheets may be made from a fibrous board commonly used in construction and known as Masonite. Masonite has one smooth surface, good for upper surface 163, and an opposing rougher surface which carries the marks of its forming wire, good for lower surface 165. Masonite can be purchased in varying thicknesses, with the preferred thickness of 0.25 to 0.50 inch being readily available.

The thickness of the spacing sheet between its top and bottom surfaces, whatever its construction, should be no more than about 1.0 inch, preferably less than 0.50 inch. Thickness of at least 0.125 inch is generally necessary for adequate durability when a pressed fibrous material such as Masonite is used. 0.125 inch Masonite is also fairly rigid and fairly free from susceptibility to localized contour changes. At over 1.0 inch, the weight and cost tend to be excessive, though it is functionally satisfactory. And so thicker sheets are part of this invention, though they are not preferred.

Figure 4:
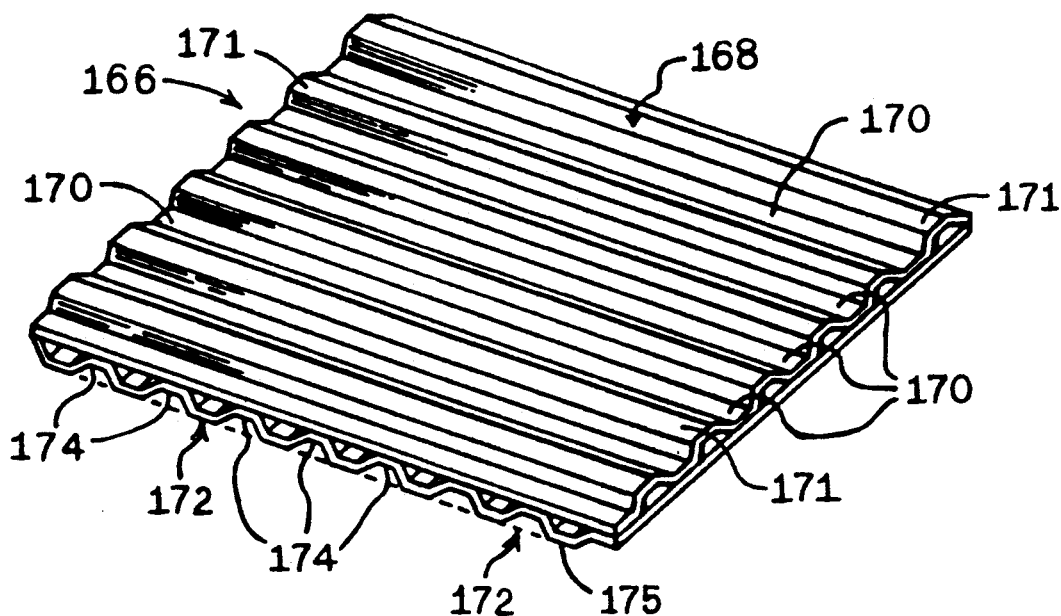
FIGS. 4 and 4A show pictorial views of, respectively, another novel spacing sheet and a corresponding novel pallet used in this invention.

For use with compressible load materials, and especially those having an uneven top surface, as described in more detail herein, and illustrated in the several drawings, a spacing sheet such as that seen at 166 in FIG. 4 is used. Spacing sheet 166 has an upper facing surface 168 similar to upwardly facing surface 78 of stripper plate 86, and having a plurality of generally parallel channels 170 and corresponding ridges 171 extending generally across the upper surface 168. A lower facing surface 172 is similar to downwardly facing surface 82 in plate means 70 and has a plurality of channels 174 and corresponding ridges 175 extending generally across it. The upper and lower facing surfaces of spacing sheet 166 are generally defined at the extremities of those surfaces as they are farthest spaced from each other. Thus the upper and lower facing surfaces are physically discontinuous over the areas of channels 170 and 174, but are generally defined as the planes in which the physical upper and lower facing surface elements reside.

Referring to the combination of FIGS. 4 and 15, it is seen that the lower surfaces of stacks 12 of sheet product have surface-to-surface contact with spacing sheet 166 at ridges 171 on its upper surface 168. Similarly, on those stacks overlain by a spacing sheet 166, the upper surface of the stacks have surface-to-surface contact with the corresponding sheet 166 at its ridges 175 on lower surface 172. The weight of the product overlying the respective spacing sheet applies a downwardly directed force between the product and the corresponding surfaces. To the extent that force is distributed evenly over the surface area of the product adjacent the spacing sheet, any deformation of the product by that force is minimized. For example, if ridges 171 were narrow, for example 1 cm. wide, and channels 170 were correspondingly wider, for example 4 cm. wide, then the product would tend to deform under the force of the weight, into channels 170.

With such deformation, the product would extend somewhat into channels 170, such that the elevational adjustment of fingers 210 would necessarily become more critical in order to ensure that the lowermost unit of the load is removed during the depalletizing operation. Distribution of the load force over the entire surface of spacing sheet 166 would only be possible by deletion of channels 170 and 174 as is done in the spacing sheets of FIG. 3. With respect to the ridge-and-channel spacing sheets of FIG. 4, it is thus desirable that the surface portions of ridges 171 coincident with upper facing surface 168 constitute a significant portion of surface 168. Conversely especially the widths of channels 170 are preferably small. Thus the top of the spacing sheet can be characterized in that the ridges 171 should coincide with upper facing surface 168 over at least 30%, preferably at least 50%, and highly preferably at least 70% of the surface area of the spacing sheet, in combination with a maximum spacing between the portions of the ridges, which are in the upper surface (this corresponding generally with channels 170), of no more than 5 cm, preferably no more than 4 cm, highly preferably no more than 2.5 cm. To the extent channels 170 can be narrowed while allowing for adequate tolerances to accept fingers 210, even narrower channels are preferred, as the overall result is a minimizing of unevenness of pressure over the surface area of the product. Similar dimensional relationships and preferences exist with respect to lower facing surface 172 and its ridges 175 and channels 174, whereby ridges 175, comprising a bottom surface of the spacing sheet, coincide with lower facing surface 172 over at least 30%, preferably at least 50%, and highly preferably at least 70%, of the lower facing surface 172.

A similar relationship, of course, also exists with respect to the upwardly and downwardly surfaces of stripper plate 86, though to a lesser degree, since the maximum material load on stripper plate 86 is one layer.

Figure 5:
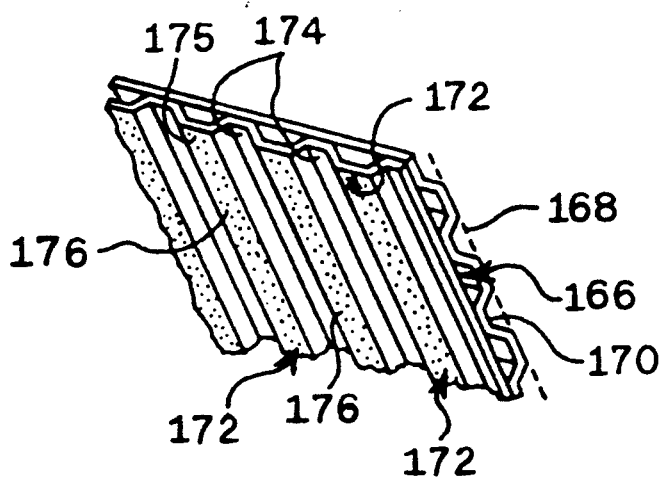
FIG. 5 shows a pictorial view of the bottom of a portion of the spacing sheet of FIG. 4.

In some embodiments, channels 170 and 174 in the upper and lower surfaces respectively are preferably oriented perpendicular to each other in the spacing sheets 166, which are preferred for use in the method of the invention with compressible load materials. In other embodiments, they are preferably paralle. As seen in FIG. 5, lower surface 172 may have projecting friction elements distributed thereover, especially on ridges 175. The projecting friction elements may comprise roughness of the surface of the material from which the elements of the lower surface are made. They may alternately include materials adhered to the elements of the lower surface 172. Typical of such materials are sand and grit, or the like, adhesively attached to the surface elements.

In any event, it is preferred in some embodiments that the lower, or bottom, surface of the spacing sheet, whether 161 or 166, have a coefficient of friction "cofb" measurably greater than the coefficient of friction "coft" of the top surface. Coefficient of friction is determined by placing two similar surfaces against each other and measuring the sliding friction as the surfaces slide relative to each other, and with a given force urging the surfaces toward each other. In general, the functional sliding properties of the upper surface 170 correspond with the sliding properties previously described for upper facing surface 163 of sheet 161.

The palletizer 10 operates generally as follows, with compressible load materials. A pallet 74 is placed beneath the right end of the frame 14 as shown in FIG. 1. A spacing sheet 166 is placed on the pallet 74 such that the channels 170 in the upper facing surface 168 are oriented to extend in a direction compatible with that direction which has been predetermined to be desirable as a direction for sliding the material off the spacing sheet when the material is to be removed from the spacing sheet. Individual stacks 12 of paper are transported to the palletizer 10 by the conveyor means 154 as shown in FIG. 2. When an entire row of stacks is assembled at the end of the conveyor means 154, the pusher means 158 pushes the row of stacks onto the staging area 162. This process continues until an entire layer of stacks of paper has been accumulated. Then, with the plate means 70 in the left position, or adjacent the staging area 162, and with the carriage 22 at a height such that the stripper plate 86 is generally level with the staging area 162, the pusher means 158 pushes the entire layer of stacks of paper onto the stripper plate 86.

Figure 9:
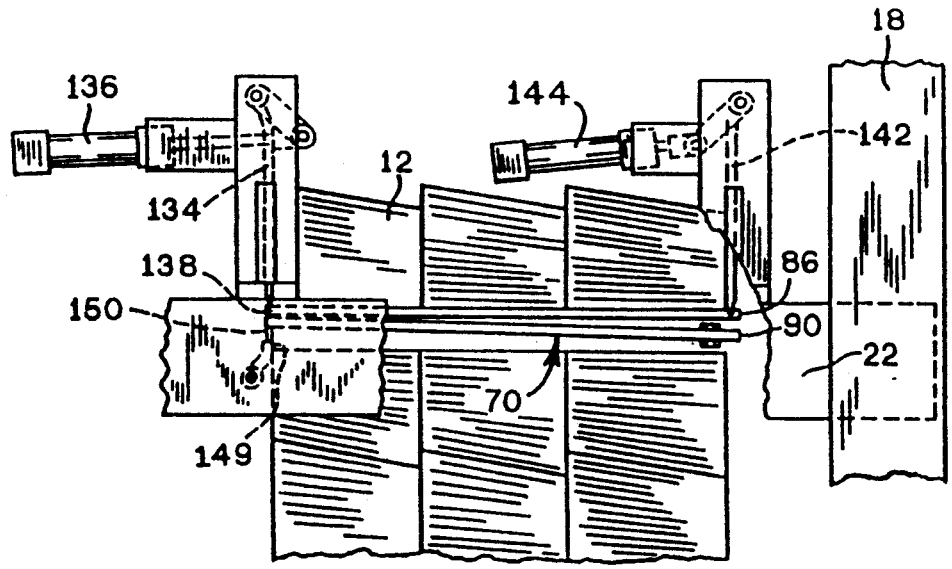
Figure 11:
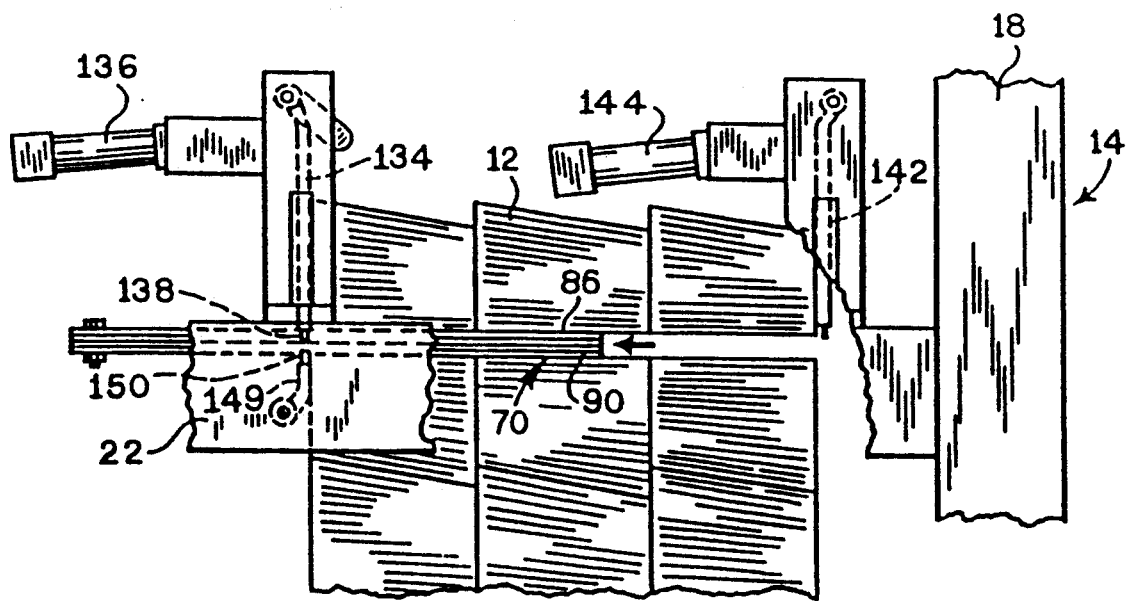

The carriage 22 then moves to a height above the supporting surface (either the spacing sheet, or a previously deposited layer of stacks of papers), as shown in FIG. 8 and the plate means 70 moves to the right, such that it is positioned above the pallet, as shown in FIG. 9. The carriage 22 is lowered, with essentially full surface contact between the top of the supporting surface and downwardly facing surface 82 of sensing plate 90. The lowering of carriage 22 is stopped by upward movement of the sensing plate 90 as described previously. This position is shown in FIG. 10. With the guide plates 134 and 142 in the lowered position, with the fingers 150 in the raised position, and with the underlying layer under compression, and thereby changing its overall height as is obvious from FIGS. 10 and 11 the plate means 70 is withdrawn from the right to the left, as shown in FIG. 11. As plate means 70 moves to the left, the friction between the upwardly and downwardly facing surfaces 78 and 82, and the corresponding overlying material and the underlying supporting surface, tends to drag those respective members which are located adjacent the plate means 70. With plate 134 lowered, the fingers 138 project into channels 102, and the combination of plate 134 and fingers 138 prevents the stack of papers on the stripper plate 86 from moving with the stripper plate 86. The plate 149 and fingers 150 prevent the supporting surface on the underlying layer from being dragged along with the sensing plate 90 by the friction between sensing plate 90 and the supporting surface. See FIGS. 11 and 12. When the plate means 70 reaches the left position, the guide plates 134 and 142 are returned to the raised position, the plate 149 and fingers 150 are returned to the lowered position, and the carriage 22 is returned to the position in which the stripper plate 86 is level with the staging area 162. The above steps are repeated until the pallet is as full as desired.

When the desired quantity of material has been loaded onto the pallet, and wherein the material is underlain by one or more spacing sheets 166, the loaded pallet is removed from the palletizer. The loaded pallet, as it leaves the palletizer, appears typically as seen in FIG. 15; in which each layer 178 is underlain by a spacing sheet 166 on the pallet 74.

In the embodiment contemplated for most frequent use, the product is palletized in one manufacturing, or handling, facility and is shipped to another facility, such as another factory or a warehouse, before it is depalletized. In another embodiment, the purpose of palletizing is for temporary storage, or warehousing, with subsequent depalletizing in the same facility. In some cases, manipulation of load material on the pallet load 167 may take place while the material on the pallet. In any event, at some point, it is usually desirable to remove the material from the pallet. The removal process, in the method of the invention, usually takes place at a location different from the location of palletizing. Namely the depalletizing usually takes place at a depalletizer, such as the one seen in FIGS. 16-20.

It will be appreciated that many of the strutural components of the palletizer 10 of FIGS. 1 and 2 are similar to corresponding structural components of depalletizer 180 of FIGS. 16-20. Thus a floor-mounted, generally non-mobile palletizer as seen in FIG. 1 may be designed to also perform the depalletizing operation, when fitted with appropriate adaptations and operating controls. In the event the palletizer being used is capable of performing the depalletizing operation, then the locations of the palletizing and depalletizing operations can be the same.

In the accomplishment of the method of handling material in the invention, it is important that the spacing sheet be compatible with use in both the palletizer and the depalletizer equipments, such as the equipments seen in FIGS. 1, 2, and 16-20. Referring now to FIG. 15, it is seen that upper channels 170 in the upper spacing sheet 166 are oriented in the same direction as upper channels 170 in the lower spacing sheet 166. It will be seen hereinafter that the orientation of channels 170 determines the direction, relative to the spacing sheet, in which the corresponding overlying layers are preferably removed from the pallet. Thus when all material is to be removed in the same direction, all the spacing sheets 166 will usually have their channels oriented in the same direction. Alternately if the layers of material on a given pallet 74 are to be pushed off the pallet in differing directions, then the spacing sheets may preferably be oriented relative to those respective directions.

Whatever the orientation of the spacing sheet relative to the direction in which the materials are to be unloaded, it is usually important that thin-section material, namely load units less than 0.25 inch thick, be so oriented on the upper surface 168 (and including channels 170) of a given spacing sheet that the load materials can be slid off surface 168 by a pushing action in the required direction.

Figure 16:
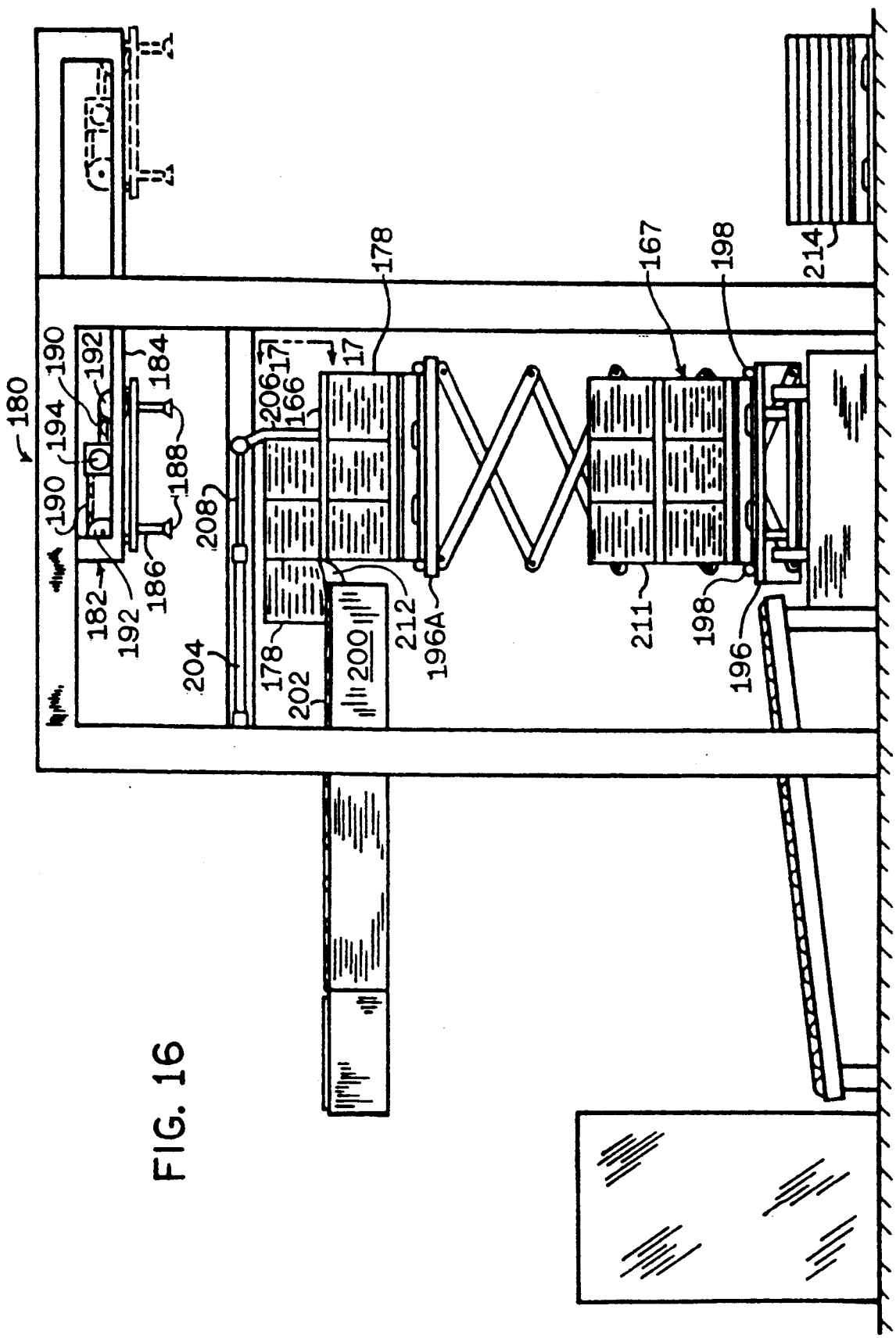
FIG. 16 shows a side elevation view of a depalletizer used in the invention, with the top layer of material being pushed off the spacing sheet, and thus off the pallet.
Figure 18:
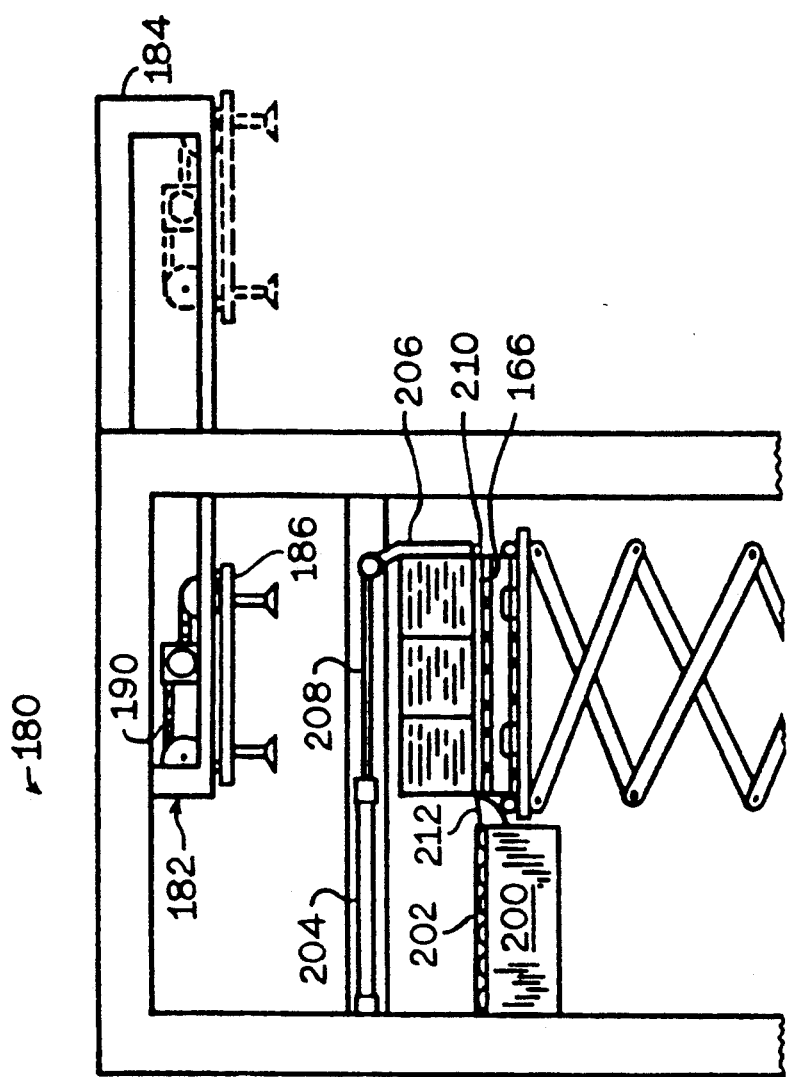
FIG. 18 is a side elevation view as in FIG. 16 (partially cut away) with the pallet having been further raised for removal of the bottom layer of material.
Figure 17:
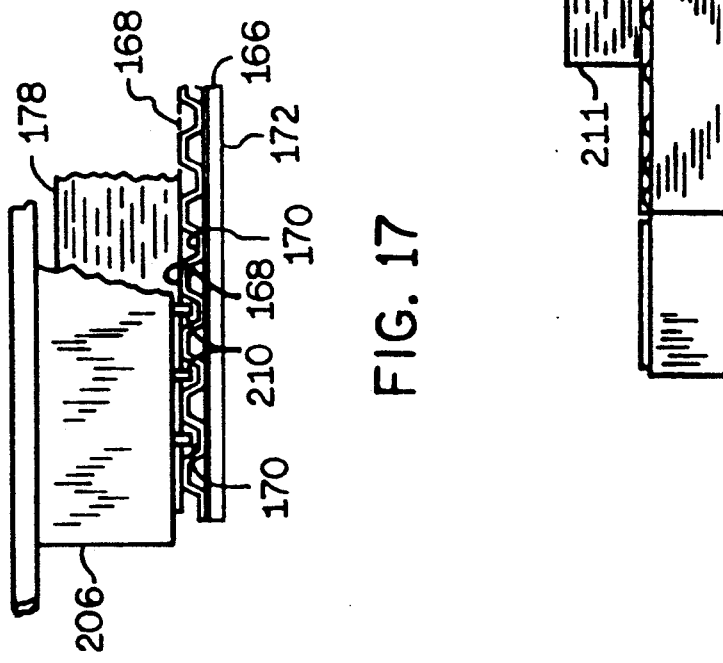
FIG. 17 is a partial elevation view taken at 17—17 of FIG. 16, and showing projecting means projecting into the channel means in the top surface of the spacing sheet.

Referring now to FIGS. 16 and 18, a spacing sheet removal apparatus 182 includes a primary remover frame 184 and a pickup framework 186 including suction cups 188. Pickup framework 186 is suspended from frame 184. Chains 190 extend upwardly from framework 186 over pulleys 192 to motor 194. Motor 194 dispenses and winds up chains 190 in raising and lowering pickup framework 186. Pickup framework 186, chains 190, pulleys 192, and motor 194 are slidably mounted on frame 184 such that they can be moved along frame 184 such as to the phantom position as shown in FIGS. 16 and 18.

A depalletizing operation will now be described in sequence.

A loaded pallet is placed onto a pallet table 196 as seen in FIG. 16. FIG. 16 shows one pallet table 196, lowered, and a second pallet table 196A, raised, as described hereinafter. Any means may be used in lifting table 196, including a chain suspension as for carriage 22 in palletizer 10 of FIG. 1. The ordinary guards and lateral stabilizers have been omitted for ease of visualizing and understanding the operations of both the palletizer 10 and the depalletizer 180.

The pallet is positioned through engagement of stops 198. If the respective pallet table 196 on which the pallet has been loaded is not horizontally adjacent removal conveyor 200, such that it can be raised to a position directly adjacent the removal conveyor, then the pallet table 196 is moved laterally in the appropriate direction to bring the pallet into a position horizontally adjacent removal conveyor 200.

Once the loaded pallet and its pallet table have been brought into a position horizontally adjacent removal conveyor 200, the height, of pallet table 196 and the pallet with its load, is adjusted by raising pallet table 196 such that the load is in a position directly and physically adjacent removal conveyor 200 as seen at 196A in FIG. 16. In that position the bottom of the top layer 178 is more or less level with the belt 202 on removal conveyor 200. Preferably the bottom of the top layer 178 is slightly above the plane of belt 202. Pusher 206 is then moved into a vertical position.

Cylinder 204 is activated, withdrawing rod 208 and thereby drawing pusher 206 with it, thus pushing the top layer 178 off the load and onto the removal conveyor 200. As pusher 206 pushes the layer 178 off, fingers 210 are mounted in a downwardly cantilevered direction and extend, along their lengths, downwardly in channels 170 on the spacing sheet 166, to ensure that the bottom members of the layer are moved concurrently. See FIGS. 17 and 18.

While contents of the pallet are being pushed off, retainer 212 abuts spacing sheet 166 along the corresponding edge of the spacing sheet which is adjacent conveyor 200. The load material is pushed toward retainer 212. Retainer 212 prevents the spacing sheet, and the rest of the load, from being displaced laterally while the overlying layer 178 is being pushed off. It is important that the load be properly positioned adjacent retainer 212 such that retainer 212 is able to prevent substantial movement of materials underlying the material being pushed off the pallet load. Where loose material, such as stacks 12 of newspaper, are being depalletized, restraint of particularly the uppermost newspapers underlying the spacing sheet is needed. These layers are readily restrained by so positioning spacing sheet 166 adjacent retainer 212 that spacing sheet 166 transfers the residual pushing stress to retainer 212 as seen in FIG.

16. In that regard, the pushing stress is transferred by friction, from the load being pushed off, to spacing sheet 166, and, by abutment with retainer 212, from spacing sheet 166, to retainer 212. The layers of material underlying spacing sheet 166 experience minimal, if any, stress from the pushing action, thus not requiring direct edge restraint contact.

In order for retainer 212 to act appropriately on a spacing sheet, the spacing sheet must have enough thickness and rigidity that it can be positioned in surface-to-surface contact with retainer 212 and maintain that contact while the overlying layer of material is being removed; without slippage, or buckling, or other damage to the spacing sheet or retainer as the overlying layer is being removed. Concurrently, the top surface 168 of the spacing sheet should be level with, or above, retainer 212 to permit sliding the load contents from the top surface 168 of spacing sheet 166, over retainer 212, and onto conveyor 200. A minimum thickness for spacing sheet 166 for use with retainer 212 is thus about 0.25 inch. Thinner spacing sheets could conceivably be used, but the difficulty in satisfactorily locating them vertically with respect to retainer 212 makes their use difficult. A spacing sheet having a thickness of 0.375 inch is better. 0.75 inch is preferred. Thicknesses as high as 1 inch are contemplated as being practical. Thicknesses greater than 1 inch will work, but spacing sheets of those designs will be more costly and would generally unnecessarily increase the height of the pallet loads in which they are used.

After the top layer is removed, pallet table 196A is raised to an appropriate height for removal of the underlying layer. Pickup framework 186 of spacing sheet remover 182 comes down to the top spacing sheet 166 and picks it up by suction cups 188. After spacing sheet 166 is adequately raised, it is moved laterally away from the pallet load as seen in phantom in FIGS. 16 and 18 and lowered onto the stack 214 of spacing sheets.

After the top spacing sheet has been removed, pusher 206 pushes the remaining layer 178 off the pallet in a manner similar to the pushing off of the previous layer, and as shown in FIG. 18. The remaining spacing sheet 166 is removed as described above, if desired. If the pallet load contains more than two layers, the previous steps of adjusting the height, pushing off one layer at a time, and removal of its underlying spacing sheet, are repeated as necessary, to remove the desired amount of material from the pallet.

The palletizer of FIGS. 1 and 2 can incorporate therein a spacing sheet positioner which is constructed essentially identical to the spacing sheet remover 182 of depalletizer 180; and which is powered and controlled to place spacing sheets on the pallet load in a process which is the reverse of the spacing sheet removal in the depalletizer.

With respect to handling thin-section load materials which are typically compressible, the invention is seen to revolve about the use of the spacing sheet 166, and the ability to so orient the spacing sheet 166 that material can be put onto it in the palletizer by automatic means and can then be removed from it in the depalletizer; such that materials may be loaded onto the pallet, and later removed from the pallet, all without the necessity of the materials being physically handled by an operator or a laborer.

In addition, in the preferred embodiments of the invention, the materials on the pallet load consist of a plurality of layers 178 such that, in the method of the invention, a top layer may be removed without distorting or otherwise damaging the materials in an underlying layer. Particularly with respect to loose stacks of material such as newspapers, the height of the stacks making up a layer is limited to that height which can reliably be pushed off the load, under controlled conditions of acceleration and deceleration, especially horizontally, without tipping or distorting the stack configuration. The specific height varies, depending on the characteristics of the load material, and is selected accordingly.

In a preferred embodiment of the overall process of the invention, and one which is used to handle pallet loads of loose stacks of newspapers, a spacing sheet 166 is placed on the pallet in the palletizer with its channels 170 oriented in a direction predetermined for ease of unloading the material from the spacing sheet in the anticipated subsequent unloading environment whereby all orientations of the pallet load between placing the load on the pallet and removing the load from the pallet must be known. A layer of loose stacks of newspaper is then placed on the spacing sheet. A second spacing sheet is placed on the top of the so-placed layer of newspapers. The second spacing sheet is similarly oriented in a direction predetermined for ease of unloading material from the second spacing sheet. The weight of the (second) overlying spacing sheet 166 is normally adequate to compress the underlying layer to bring the top of the layer to a uniform height. After the second spacing sheet has been placed, with proper orientation, a second layer of loose stacks of newspapers is placed on the second (overlying) spacing sheet.

This sequence is repeated until the desired number of layers has been placed on the pallet to thereby create the pallet load. The pallet load of material is then placed in storage.

At the time when the material on the pallet is to be further used or worked on, the loaded pallet is brought out of storage and is transferred to the depalletizer 180 where the load is removed from the pallet as hereinabove described. In the preferred embodiment, all the above activity of palletizing and depalletizing takes place without any manual labor of lifting material onto the pallet or off of the pallet. In a highly automated embodiment of the method of the invention herein, the multiple step process of removing the loaded pallet from the palletizer, storing it, and subsequently recalling it from storage and delivering it to the depalletizer can also be peformed without any human intervention other than operation of the controls of conventional material handling storage and retrieval apparatus, namely, in-process storage and retrieval.

Indeed, in a fully automated environment, the loads are handled, between the time they leave the palletizer and the time they enter the depalletizer, entirely by automatic conveying means which inherently requires predetermination of all orientations of the pallet load between placing the load on the pallet and removing the load from the pallet. In that case, there is never any need to insert a lifting means under the load (i.e. fork lift forks), and so the pallet can be dispensed with and the load can be built on a spacing sheet, such as at 166, having sufficient rigidity to support the load. By definition of the system being fully automated, every orientation (with respect to a vertical axis) of the load between its entrance into the automated system, and its exit of the system is necessarily predetermined by the time the spacing sheet is placed at the load forming station. This means that the orientation of the spacing sheet is predetermined at every stage of the process including—in the palletizer, during transportation into storage, while in storage, during retrieval from storage, and in the depalletizer. Accordingly, the orientation of the spacing sheet, when it enters the automated system in the palletizer, determines its orientation at each stage of the automated process, including its orientation when it arrives at its ultimate destination, the pallet table or other unloading station in the depalletizer, which can be generically described as an unloading station. Knowing this, one can, by correct orientation of the spacing sheet in the palletizer, assure that the channels will be properly aligned with pusher 206 for pushing the layer off the spacing sheet, when the load arrives at the pallet table of the depalletizer.

In less automated embodiments, the pallet load of material may be picked up from the output area of the palletizer, as, for example, by a forklift, and transported to the storage location. The forklift may also be used to transport the pallet load from storage to the depalletizer or other work location.

As indicated above, it is preferred that the spacing sheets be oriented, at the time they are made part of the pallet load, in a direction to readily accommodate the preferred direction of unloading of each of the spacing sheets, in a given load, in the depalletizer. In the alternative, the spacing sheets may be incorporated into the pallet load without regard to the direction of unloading in the depalletizer, so long as the layer on each spacing sheet is compatible with sliding in the direction of the channels 170 in upper surface 168. To the extent the channels 170 are not aligned in the palletizing operation, for direction of unloading, the pallet may then be rotated/oriented prior to removing the material from the spacing sheet, to properly align the channels 170 for the depalletizing operation.

Figure 4A:
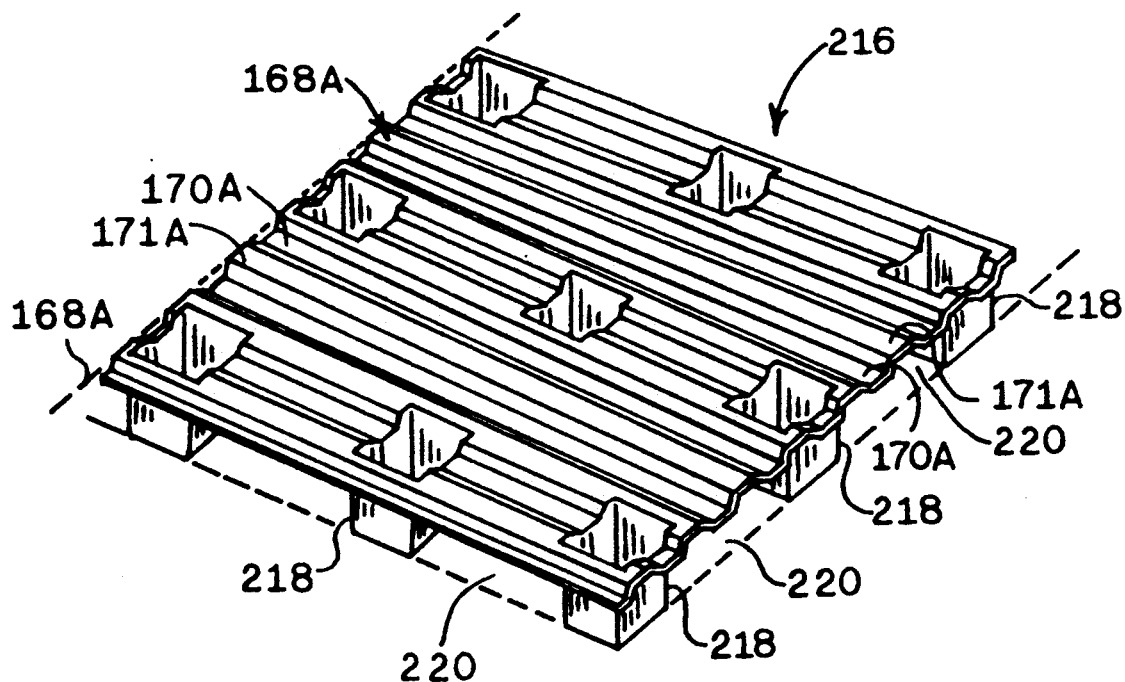

While the invention has been described to this point within the context of using a spacing sheet such as 166 in FIG. 4 under each layer, it is entirely within the scope of the invention that the spacing sheet be incorporated into a pallet used to support the first layer. The modified pallet 216 is seen in FIG. 4A. Pallet 216 has a plurality of conventional feet 218 depending generally downwardly from an upper surface 168A. The upper surface 168A includes a plurality of generally parallel alternating channels 170A and ridges 171A. Upper surface 168A and channels 170A generally correspond to surface 168 and channels 170 in spacing sheet 166, and serve the same functions in the modified pallet 216 as surface 168 and channels 170 serve in spacing sheet 166. Ridges 171A generally correspond to ridges 171 in spacing sheet 166, and incorporate the sliding properties as described for the upper facing surface 163 of spacing sheet 161.

The shape and configuration of feet 218 are not critical. What is important is that feet 218 adequately support channeled surface 168A and provide spacings 220 for insertion of lifting equipment, such as a fork lift, to be placed under surface 168A for the purpose of lifting the pallet 216, with or without a load.

Pallet 216 incorporates the ridge and channel features of spacing sheet 166 with the spacing function (normally performed by a conventional pallet as at 74) of spacing the upper surface 168 from the underlying floor.

When using pallet 216 to build a load, pallet 216 takes the place of the combination of conventional pallet 74 and spacing sheet 166 (See FIG. 15) for supporting the first layer of the load. A spacing sheet 166 as in FIG. 4 is preferably used for supporting the second and subsequent layers. A two layer load, using a pallet 216 to support the first layer and a spacing sheet 166 to support the second layer, is seen in FIG. 15A. Thus each layer 178 has, as an underlying supporting member, either a pallet 216 or a spacing sheet 166. With appropriate load material, the underlying supporting members may be spacing sheets 161 and a corresponding, smooth-topped pallet. Preferably, the coefficient of friction of the upper surface is as described above for the spacing sheets 161 and 166.

With respect particularly to the depalletizing operation, the process embodies sliding the load material off the corresponding ridge and channel surface. In order to effect the sliding, it is necessary that the ridge segments 171 or 171A respectively, of supporting surface 168 or 168A, which are in contact with the load material have a sufficiently low coefficient of friction with respect to the load material that the load material can readily be pushed off the supporting surface with a modest amount of force, as by pusher 206. As the functional coefficient of friction depends not only on surface 168/168A, but also on the characteristics of the load being carried, the absolute measured coefficient of friction for any given surface 168/168A, or a corresponding upper surface of a spacing sheet, varies as an engineering adjustment to the characteristics of the load to be carried. Thus the term "low coefficient of friction" is defined as that surface friction characteristic which readily accommodates the sliding removal of the carried load.

For use with thicker section load units, the pallet as at 216 may incorporate, as its upper surface, a smooth surface as at 163 of FIG. 3 rather than the ridge and channel surface as at 168 in FIG. 4. The sliding properties of the top surface of the novel pallet are as described for surface 163 of sheet 161. Absent the channels and ridges, the need for orientation of the pallet with respect to the direction of sliding removal is obviated; although orientation with respect to holding means on the depalletizer may be desirable, as described hereinafter.

In the embodiments discussed hereinabove, retainer 212 is used to restrain the underlying portion of a load so that it remains on the pallet while the top layer is being pushed off.

In that regard, the retaining is by means of abutment. Where the overlying material is easily slid off the load, and the lower surface of the spacing sheet has adequate friction, and given good load stability, in some cases no specific retainment of the supporting member is required.

Figure 19:
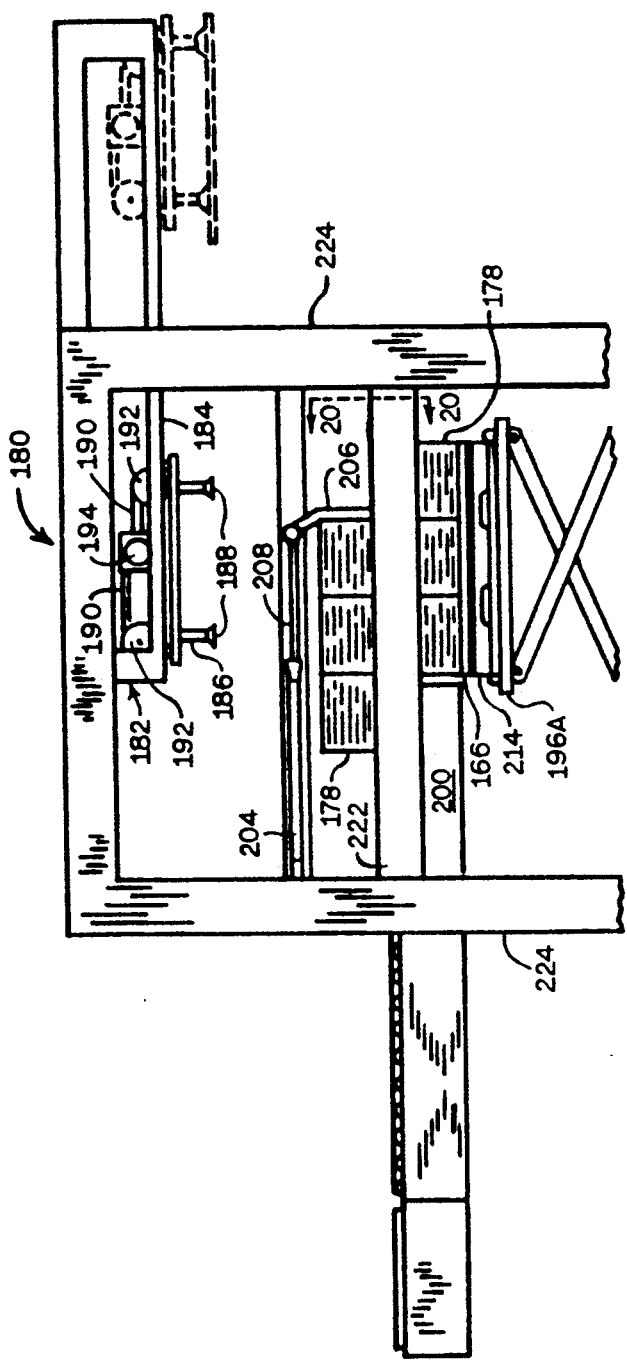
FIGS. 19 and 20 show a second means for holding the spacing sheet in position in the depalletizer.
Figure 20:
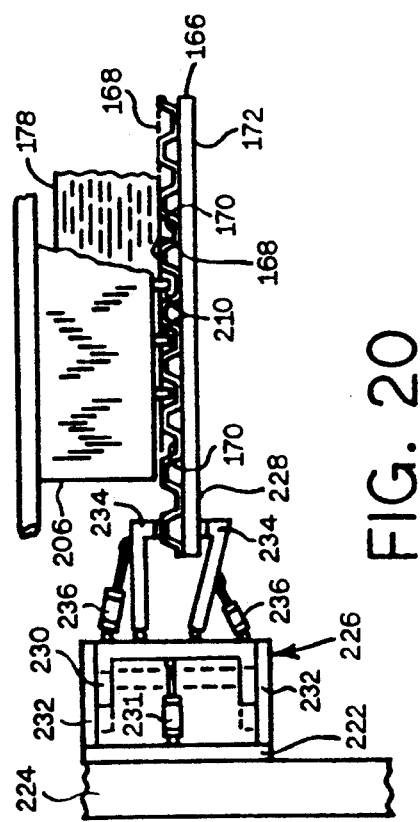

FIGS. 19 and 20 illustrate clamping as still another means of restraining the underlying load. In FIGS. 19 and 20, a horizontal frame member 222 extends between posts 224 of the depalletizer 180. A clamping mechanism 226 is mounted on frame member 222 for clamping an extended edge 228 of spacing sheet 166 while the overlying load is being pushed off. For using this embodiment of the invention, spacing sheet 166 is wider than the load by an amount sufficient to provide a free edge for gripping as at 228.

Clamping mechanism 226 comprises a clamp holder 230 slidably mounted in holder supports 232. Sliding movement of holder 230 is effected by activation of cylinder 231. Two pairs of clamping jaws 234 are pivotally mounted to clamp holder 230. The clamping jaws 234 are opened and closed by means of activating cylinders 236.

The operation of the illustrated clamp mechanism 226 is as follows. When a pallet load of material is to be raised to a position adjacent conveyor 200, cylinder 231 is activated to retract clamping mechanism 226 toward frame member 222 (from the extended position shown in FIG. 20). Clamping jaws 234 are thus removed from the vertical path of travel of the extended edge 228 of spacing sheet 166 while the pallet load is being raised into position. When the pallet load is in position for unloading a layer as in FIGS. 16, 18, and 19, the spacing sheet underlying the top layer is in the position shown in FIG. 20, with the clamping mechanism 226 in the retracted position with the jaws 234 open. Cylinder 231 then extends clamp holder 230 such that the open jaws 234 in each pair of jaws are respectively above and below the extended edge 228 of spacing sheet 166. Cylinders 236 are then extended on each jaw to thus close each pair of jaws 234 on the extended edge of the spacing sheet.

After the overlying layer has been removed from spacing sheet 166, jaws 234 are opened by activating cylinders 236, and clamping mechanism 226 is retracted by retracting cylinder 231. Clamp holder 230 is shown in phantom outline in the retracted position in FIG. 20. The spacing sheet is then removed by spacing sheet remover 182, and the clamping mechanism 236 is ready to receive another spacing sheet 166.

By using two or more spaced pairs of jaws along extended edge 228, spacing sheet 166 is firmly held in position, and prevented from moving while the overlying layer is being pushed off. Preferably a second, like, clamping mechanism is positioned on the opposing side of the depalletizer, whereby the spacing sheet is clamped on both sides of the load. To the extent jaws 234 are used to hold the spacing sheet 166, then retainer 212 may be deleted, and the vertical positioning of the spacing sheet is less critical; it then being controlled by the spacing between jaws 234 when the jaws are open. Further, the thickness of the spacing sheet can be reduced, since no abutment is necessary when using clamping mechanism 226. In that event, the minimum thickness is that thickness of the spacing sheet which still provides durability, and enough rigidity to support its own weight for the distance which the sheet extends beyond the side of the load. Thus the extended edge 228 must project outwardly to be gripped by clamps 234. In some cases, an extruded plastic sheet, as of for example, high density polyethylene about 20 mils thick is an acceptable spacing sheet for use with materials which need not afford themselves of channels as at 170 in spacing sheet 166. These spacing sheets, however, must have oversize dimensions, exceeding those respective dimensions of the load, so they project extended edges for interfacing with clamps 234, preferably on 2 opposing sides. Such sheets may be readily resiliently deflectable. In that event, the sheet may be oversized on the third dimension, providing an extended edge in that direction in which the load will be pushed off. Thus at least 2, and preferably 3, adjacent extended edges are provided. As the load is raised into position adjacent the conveyor, or other removal surface, it is raised above the unloading height. As the load passes conveyor 200, the extended edge of the spacing sheet adjacent conveyor 200 is deflected downwardly by conveyor 200. As the deflected extended edge passes clear of the adjacent edge of the conveyor 200, the downwardly deflected edge resiliently returns to its normal horizontal orientation, whereupon the edge is above the end portion of conveyor 200. The load is then returned to the unloading height. This results in the extended edge adjacent conveyor 200 resting on conveyor 200, and serving as a ramp, or bridge, between the load and the conveyor.

In an extension of the above teaching, and wherein the spacing sheets are resiliently deflectable, and project outwardly from both the pallet and the load material, toward conveyor 200 and toward clamping mechanism 226, the lower members of jaws 234 are made stationary. Cylinders 231 are omitted. Clamp holders 230 are rigidly mounted at the position shown in FIG. 20. The opening movement of upper jaw members 234 is extended so that they can be moved completely out of the paths of travel of edges 228. Accordingly, as the load is raised above the unloading height until the extended edge adjacent conveyor 200 is clear of conveyor 200, the extended edges adjacent the jaws 234 are also passing clear of, and projecting outwardly over, lower jaw members 234. As the load is then moved downwardly to the unloading height, it also positions the corresponding extended edges onto the lower jaw members 234. Moving the upper jaw members 234 downwardly closes the jaws 234, effectively clamping and holding the spacing sheet.

Clamping mechanism 226 may also be used equally well with either spacing sheet, 161 or 166, and is preferred where spacing sheet 161 or the extruded plastic sheet is used in the pallet load; particularly since the most preferred thickness of 0.25 inch for spacing sheet 161 is less than the thickness preferred for use with retainer 212. To the extent a novel pallet 216 is used in place of a spacing sheet, the pallet may have corresponding extended edges and may be used accordingly with clamping mechanism 226. The pallet top surface must, of course, have sufficient rigidity and strength to support the load.

Figure 14:
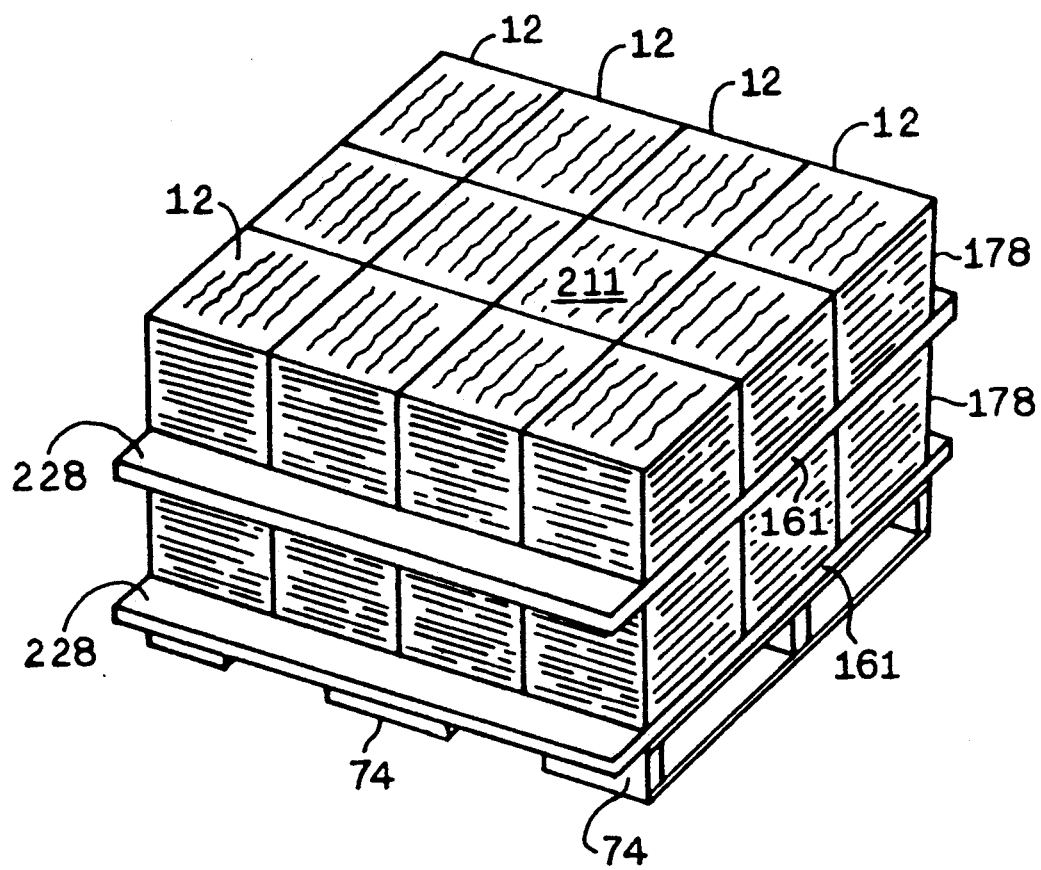
FIG. 14 shows a loaded conventional pallet wherein the load includes the spacing sheets of FIG. 3 and a plurality of layers of the material being carried.

This completes the general description of the use of the team of machines comprising the palletizer 10 and the depalletizer 180 as a system, with the appropriate spacing sheet, for handling material which may be thin in section and/or compressible; and where the material is palletized and subsequently depalletized mechanically, without the requirement to use any manual lifting labor. The proper operation of the team of machines depends heavily on using layer thicknesses no greater than that which can be readily pushed off a pallet load, with controlled acceleration and deceleration, without destabilizing the layer, and in the use of a spacing sheet which is compatible with use in the depalletizer. For thin section unit loads such as either unbundled sheets of paper, or newspapers, or newspaper sections, spacing sheets having especially the channels 170 are important for being able to ensure the depalletizing of the bottommost layers. In this case, a sheet of paper, or respectively a newspaper, is considered a load unit.

Where the load unit is thicker, such as about 0.25 inch thick, as in books, or some magazines, then channels 170 may be omitted. So long as the load unit (i.e. a magazine) is at least about 0.25 inch thick, the terminal edge of pusher 206 (with or without fingers 210) can be positioned adequately below the top of the lowermost load unit, to thus be able to push it, while still being acceptably spaced above the top of the spacing sheet 161. Typically, a Masonite board is thinner and therefore easier to handle than the spacing sheet 166 described for the channeled embodiment. It also requires relatively less capital investment. An extruded plastic sheet is thinner yet, with comparable capital savings. Holding mechanism 226 is readily used for holding a Masonite board such as 161, or the plastic sheet which includes the respective edge extensions as seen at 228 in FIG. 14.

For reasons of economy, where the unit load is thick enough, plain spacing sheets as at 161, or the corresponding plain plastic extruded sheets, are preferred. Fingers 210 of pusher 206 can push the bottom layer of, for example, magazines and reliably remove the entire layer. Where the unit load is thinner, or where a thicker unit load such as a newspaper can be easily compressed to a thinner cross-section, then the channelled spacing sheet 166 is used, so that fingers 210 can reach below the bottom surface of the load to ensure the removal of the entire load.

Within the context of this invention a layer may be fairly thin, or could be relatively thick. The systems and methods of the invention are especially useful for palletizing articles less than 1 inch thick, especially less than 0.5 inch thick, most especially less than 0.25 inch thick. While thicker materials can readily be handled, the special features of this invention are most easily recognized in handling the thinner material.

Also within the context herein, a pallet load may consist of a single layer (or part of a layer), or it may have two or more layers.

Whenever herein a spacing sheet is disclosed for use under a first layer, a novel pallet as disclosed herein and having the same top surface characteristics as a spacing sheet described for that application, and wherein the top surface is sufficiently rigid to carry the load, may readily be substituted. Accordingly, either the spacing sheet as at 161 or 168, or the novel pallet having the same top surface characteristics can provide the support surface under the first layer of the load. Indeed, the pallet surface need not be channeled. It may be smooth, as appropriate for the material of the load, similar to the disclosed Masonite; with the sliding properties being the controlling characteristic.

Thus it is seen that the invention provides a method of placing layers of material on a supporting surface, such as a pallet, having a supporting member, and subsequently moving that material to another location, with optional intermediate storage, and removing the material from the pallet by sliding it off the supporting member. It is further seen that the use of a supporting member having a plurality of channels in its top surface, and wherein the channels are oriented in a predetermined direction, is desirable in some embodiments in order that the fingers extending from the pusher used to push the material off the supporting member may extend into the channel means in the top surface of the supporting member, thus insuring that the bottom elements of the layer (wherein the layer is comprised of thin sections of material) are removed from the supporting member uniformly with the balance of the layer. The invention is further seen to provide novel pallet loads, using the spacing sheets described, including extended edges on the spacing sheets and novel means for holding a spacing sheet while a layer is being pushed off the load.

The term "supporting surface" includes the "supporting members" herein, which are those members having the novel characteristics of the pallets 216 and the spacing sheets 161 and 166 herein disclosed, as well as the extruded plastic sheets.

The invention is seen to provide a team of material handling machines, including a palletizer and a depalletizer which are capable, when used with properly selected supporting members, of handling material including books, magazines. and compressible stacks of newspapers in both the palletizing and depalletizing functions without any need for manually lifting any of the material. Materials which are palletized using general purpose conventional palletizers may also be handled according to the invention. Exemplary of products which are advantageously handled using the material handling aspects of the invention are especially consumer paper products, such as toilet paper in single or multiple roll packages, packages of rolls of paper toweling, boxes of facial tissue, and the like. The invention is especially adapted to handling products, or piece parts, or subassemblies which need in-process storage, or temporary storage before shipment.

The invention further provides novel pallets, pallet loads, and material loads, all especially advantageous for use in handling material, especially in automated processes for handling materials.

Using this invention, printers of newspapers or magazines can palletize printed material (thin or thick section), store it, and depalletize it without any need to manually lift any of the printed material in moving it about their own manufacturing and distributing operation. Thus, the product need not ever be bundled for purposes of handling it mechanically on pallet loads.

Having thus described the invention, what is claimed is:

1. A method of handling material on a supporting surface, said method comprising the steps of:
   (a) placing on said supporting surface a spacing sheet, said spacing sheet being no more than 1 inch thick, and
      (i) having an upper surface,
      (ii) being adapted to receive a layer of said material on said upper surface,
      (iii) having edges, and
      (iv) having a plurality of spaced apart channels each extending from one of said edges along a straight line direction generally across that portion of said upper surface which is adapted to receive said layer, said channels being defined by channel surfaces, said channel surfaces comprising portions of said upper surface of said spacing sheet; and
   (b) placing a layer of said material on said spacing sheet, thereby creating a load,
   whereby said channels in said spacing sheet, in said load, are adapted to facilitate pushing removal of said layer by a pushing means wherein fingers on said pushing means extend downwardly into said channels and are spaced from said surfaces of said channels as the pushing means, including the fingers, pushes said layer, along said direction of said channels, off said spacing sheet.

2. A method as in claim 1 and including
   placing a second spacing sheet having said channels, each extending substantially continuously along a straight line across said upper surface, on said layer, and
   placing a second layer of said material on said second spacing sheet.

3. A method of handling sheets of thin-section material on a supporting surface, said method comprising the steps of:

(a) placing on said supporting surface a spacing sheet, said spacing sheet being no more than 1 inch thick, and
   (i) having an upper surface,
   (ii) being adapted to receive a layer of said material on said upper surface,
   (iii) having edges, and
   (iv) having a plurality of spaced apart channels each extending from one of said edges along a straight line direction generally across that portion of said upper surface which is adapted to receive said layer, said channels being defined by channel surfaces, said channel surfaces comprising portions of said upper surface of said spacing sheet; and
(b) placing, on said spacing sheet, a plurality of unbound stacks of thin-section material, thereby creating a layer and a corresponding load,
whereby said channels in said spacing sheet, in said load, are adapted to facilitate pushing removal of said stacks of said thin-section sheet material by a pushing means wherein fingers on the pushing means extend downwardly into said channels and are spaced from said surfaces of said channels as the pushing means, including the fingers, pushes said layer, along said direction of said channels, off said spacing sheet.

4. A method as in claim 3 and including placing a second spacing sheet, having said channels extending across the upper surface thereof, on said layer, said channels on said second spacing sheet being oriented in a direction predetermined to be desirable as a direction for sliding movement of a second layer of said material off said second spacing sheet, and placing on said second spacing sheet, a plurality of unbound stacks of thin-section sheet material, thereby creating a second layer of said stacks of thin-section sheet material on said second spacing sheet and in said load.

5. A method of handling material in an automated system, wherein loads are formed on a spacing sheet at a load forming station, are moved about in the system, and are unloaded from said spacing sheet at an unloading station, said method comprising the steps of:
   (a) placing said spacing sheet on a supporting surface at said load forming station, said spacing sheet
      (i) having an upper surface,
      (ii) being adapted to receive a layer of said material on said upper surface, and
      (iii) having a plurality of spaced apart channels each extending generally across that portion of said upper surface which is adapted to receive said layer;
   (b) placing on said spacing sheet a layer of said material, and thereby creating a load comprising said spacing sheet and said material, and whereby said layer can be pushed off said spacing sheet in the direction of extension of said channels;
   (c) moving said load to a location away from said load forming station;
   (d) placing said load in said unloading station;
   (e) removing said layer from said spacing sheet by pushing said layer in the direction of extension of said channels;
   (f) prior to completing said creating of said load at said load forming station, determining, relative to said supporting surface, every orientation of said load while said load is in said automated system, including every orientation as said load traverses said automated system between being formed at said load forming station and being disassembled at said unloading station so that the orientation of said spacing sheet in said load forming station is such that said channels will be oriented in the direction along which said layer is pushed in step (e) in said unloading station; and
   (g) prior to completing said creating of said load at said load forming station, orienting said spacing sheet in said load forming station according to the orientation determined in subparagraph (f).

6. A method as in claim 5 and including, after the step of placing said layer of material, comprising a first layer, on said spacing sheet, and before moving said supporting surface to another location, the step of placing a second layer of material on said first layer, thereby adding to said load.

7. A method as in claim 6 and including the step of compressing said first layer while placing said second layer on said first layer.

8. A method of handling material as in claim 5 and including performing said step of orienting said spacing sheet by the time said spacing sheet is placed on said supporting surface.

9. A method as in claim 5, wherein said spacing sheet is no more than 1 inch thick, and including the further steps of
   (f) placing a successive said spacing sheet on top of the layer of said material;
   (g) placing on said spacing sheet a further layer of said material, thereby creating a greater load comprising said spacing sheets and said material layers thereon; and,
   (h) performing steps (c) through (e) inclusive with respect to each successive spacing sheet.

10. A method of handling thin-section material in an automated system, wherein loads are formed on a spacing sheet at a load forming station, are moved about in the system, and are unloaded from said spacing sheet at an unloading station, said method comprising the steps of:
   (a) placing said spacing sheet on a supporting surface at a load forming station, said spacing sheet
      (i) having an upper surface,
      (ii) being adapted to receive a layer of said material on said upper surface,
      (iii) having edges, and
      (iv) having a plurality of spaced apart channels each extending in a direction from said one edge along a straight line generally across that portion of said upper surface which is adapted to receive said layer, said channels being defined by channel surfaces, said channel surfaces comprising portions of said upper surface of said spacing sheet; and
   (b) placing on said spacing sheet said layer of said thin-section material, and thereby creating a load, and whereby said layer can be pushed off said spacing sheet in the direction of extension of said channels; and
   (c) moving said load to a location away from said load forming station;
   (d) placing said load in said unloading station;
   (e) removing said layer from said spacing sheet by pushing said layer in the direction of extension of said channels;
   (f) prior to completing said creating of said load at said load forming station, determining, relative to said supporting surface, every orientation of said load while said load is in said automated system, including every orientation as said load traverses said automated system between being formed at said load forming station and being disassembled at said unloading station so that the orientation of said spacing sheet in said load forming station is such that said channels will be oriented in the direction along which said layer is pushed in step (e); in said unloading station; and (g) prior to completing said creating of said load in said load forming station, orienting said spacing sheet in said load forming station according to the orientation determined in subparagraph (f).

11. A method of handling material, comprising:
(a) placing a first layer of material on a pallet, said pallet comprising an upper surface member having a plurality of generally parallel and alternating channels and ridges extending across said upper surface member, and a plurality of feet extending downwardly from said upper surface member toward a supporting surface underlying said feet;
(b) selecting a spacing sheet for use on said first layer of material, said spacing sheet being no more that 1 inch thick, and
  (i) having an upper surface, said upper surface being adapted to receive a layer of said material thereon, and
  (ii) having a plurality of spaced apart channels extending in a direction from one edge of said spacing sheet along a straight line generally across that portion of said upper surface which is adapted to receive the layer, said channels being defined by channel surfaces, said channel surfaces comprising portions of said upper surface of said spacing sheet; and
(c) placing said spacing sheet on said first layer of material,
(d) placing a second layer of material on said spacing sheet, and
(e) removing said second layer of material from said spacing sheet by extending pushing fingers downwardly into said channels, and pushing said material, with said downwardly-extending fingers, in said direction of said channels of said spacing sheet.

12. A method as in claim 11, further including removing said spacing sheet from said load, and pushing said first layer of material off said pallet in the direction of said channels in said pallet.

13. A method of handling material on a pallet, said method comprising the steps of:
(a) palletizing said material by
  (i) loading material on a pallet in layers and
  (ii) placing a spacing sheet having a top and a bottom under each of said layers, said top being compatible with sliding removal of said layers, the top of each said spacing sheet being adjacent the bottom of a corresponding overlying layer, said top having a coefficient of friction "coft" due to intrinsic properties of said top, said bottom having friction elements thereon, whereby said bottom has a coefficient of friction "cofb" greater than the coefficient of friction of the respective said top, said friction elements extending over at least 30% of said bottom;
(b) depalletizing said material by
  (i) pushing the top layer off said pallet, thereby exposing an underlying spacing sheet,
  (ii) removing said exposed underlying spacing sheet from said pallet, and
  (iii) repeating steps (b) (i) and (b) (ii) until the desired amount of material is removed from said pallet.

14. A method as in claim 13, said spacing sheets being sufficiently rigid that said top of said spacing sheets in said load are free from localized deformed contours such as would correspond to configurations of the adjacent layers of said load, and as would interfere with pushing removal of a respective said layer from said load.

15. A method of removing a load of material from a pallet, said load having one or more layers, and including a resiliently deflectable spacing sheet, said spacing sheet having at least one extended edge, underlying each said layer, said spacing sheets having a normally horizontal orientation, said method comprising the steps of:
(a) placing said pallet in a predetermined feed location horizontally adjacent a receiving removal means having a receiving removal surface, and such that said extended edge on each said spacing sheet is directed toward said removal surface, and extends toward said receiving surface a distance sufficient to overlap said receiving surface, said removal surface being adapted to receive one said layer;
(b) raising said load, on said pallet, to a height such that the top one of said spacing sheets, under the top one of said layers is higher than said removal surface, accompanied by (i) a downward deflecting of said extended edge by said receiving removal means as said spacing sheet passes said removal means in a generally vertical direction and (ii) resilient return of said extended edge to said normal horizontal orientation whereupon a portion of said extended edge of said top one of said spacing sheets is above a portion of said receiving removal means;
(c) lowering said load to a height compatible for sliding movement of the top layer of said load onto said removal surface, whereby said portion of said extended edge is disposed on said removal surface and functions as a bridge between said load and said removal surface;
(d) restraining movement of said spacing sheet; and
(e) pushing the top one of said layers of said load toward said removal surface, off said pallet load and onto said removal surface.

16. A method of handling material in a system wherein a load, comprising a plurality of units of material, is formed on a spacing sheet at a load forming station with a load forming apparatus, wherein the load is moved about in said system by a transporting apparatus, away from said load forming apparatus, and is delivered to a non-mobile unloading station having an unloading apparatus, wherein the load is unloaded from said spacing sheet at said non-mobile unloading station, said method comprising the steps of:
(a) placing said spacing sheet on a supporting surface at said load forming station, said spacing sheet
  (i) having an upper surface,
  (ii) being adapted to receive a layer of said material on said upper surface, and
  (iii) having a plurality of spaced apart channels each extending generally across that portion of said upper surface which is adapted to receive said layer;

(b) placing on said spacing sheet a layer of said units of material, and thereby creating a load comprising said spacing sheet and said units of material, and whereby said layer can be pushed off said spacing sheet in the direction of extension of said channels;
(c) moving said load on said transporting apparatus, to a location away from said load forming station;
(d) placing said load in said non-mobile unloading station, and correspondingly removing said load from said transporting apparatus;
(e) removing said layer from said spacing sheet, in said non-mobile unloading station, by pushing said layer across said upper surface in the direction of extension of said channels.

* * * * *